(12) United States Patent
Brainard et al.

(10) Patent No.: US 10,706,434 B1
(45) Date of Patent: Jul. 7, 2020

(54) METHODS AND SYSTEMS FOR DETERMINING LOCATION INFORMATION

(71) Applicant: PALANTIR TECHNOLOGIES INC., Palo Alto, CA (US)

(72) Inventors: Katherine Brainard, East Orange, NJ (US); Matthew Sills, San Francisco, CA (US); Rastan Boroujerdi, Menlo Park, CA (US); Ilya Nepomnyashchiy, Mountain View, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 365 days.

(21) Appl. No.: 14/842,734

(22) Filed: Sep. 1, 2015

(51) Int. Cl.
*G06Q 30/02* (2012.01)

(52) U.S. Cl.
CPC .............................. *G06Q 30/0205* (2013.01)

(58) Field of Classification Search
None
See application file for complete search history.

(56) References Cited

U.S. PATENT DOCUMENTS

| | | |
|---|---|---|
| 4,899,161 A | 2/1990 | Morin et al. |
| 4,958,305 A | 9/1990 | Piazza |
| 5,109,399 A | 4/1992 | Thompson |
| 5,241,625 A | 8/1993 | Epard et al. |
| 5,329,108 A | 7/1994 | Lamoure |
| 5,623,590 A | 4/1997 | Becker et al. |
| 5,632,009 A | 5/1997 | Rao et al. |
| 5,670,987 A | 9/1997 | Doi et al. |
| 5,754,182 A | 5/1998 | Kobayashi |
| 5,781,195 A | 7/1998 | Marvin |
| 5,781,704 A | 7/1998 | Rossmo |
| 5,798,769 A | 8/1998 | Chiu et al. |
| 5,845,300 A | 12/1998 | Comer |

(Continued)

FOREIGN PATENT DOCUMENTS

| | | |
|---|---|---|
| AU | 2012216622 | 5/2015 |
| AU | 2013251186 | 11/2015 |

(Continued)

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

(Continued)

*Primary Examiner* — Eric W Stamber
*Assistant Examiner* — Alan Torrico-Lopez
(74) *Attorney, Agent, or Firm* — Knobbe, Martens, Olson & Bear LLP

(57) ABSTRACT

Approaches for displaying a user interface including a map based on interaction data are disclosed. A set of interaction data and can be acquired and stored in a data structure. This data can be associated with a plurality of consuming entities that may have purchased something during these interactions. A set of provisioning entities can be determined based on spending or purchasing habits of the consuming entities. Based on this set of provisioning entities, a user interface can be generated which may include various shapes similar to a heat map. These shapes can indicate an average amount spent in a particular neighborhood, among other attributes.

8 Claims, 9 Drawing Sheets

(56) References Cited

U.S. PATENT DOCUMENTS

| | | |
|---|---|---|
| 5,999,911 A | 12/1999 | Berg et al. |
| 6,055,569 A | 4/2000 | O'Brien et al. |
| 6,057,757 A | 5/2000 | Arrowsmith et al. |
| 6,065,026 A | 5/2000 | Cornelia et al. |
| 6,091,956 A | 7/2000 | Hollenberg |
| 6,157,747 A | 12/2000 | Szeliski et al. |
| 6,161,098 A | 12/2000 | Wallman |
| 6,169,552 B1 | 1/2001 | Endo et al. |
| 6,173,067 B1 | 1/2001 | Payton et al. |
| 6,178,432 B1 | 1/2001 | Cook et al. |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,247,019 B1 | 6/2001 | Davies |
| 6,279,018 B1 | 8/2001 | Kudrolli et al. |
| 6,338,066 B1 | 1/2002 | Martin et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,389,289 B1 | 5/2002 | Voce et al. |
| 6,414,683 B1 | 7/2002 | Gueziec |
| 6,430,305 B1 | 8/2002 | Decker |
| 6,456,997 B1 | 9/2002 | Shukla |
| 6,483,509 B1 | 11/2002 | Rabenhorst |
| 6,523,019 B1 | 2/2003 | Borthwick |
| 6,529,900 B1 | 3/2003 | Patterson et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,584,498 B2 | 6/2003 | Nguyen |
| 6,594,672 B1 | 7/2003 | Lampson et al. |
| 6,631,496 B1 | 10/2003 | Li et al. |
| 6,642,945 B1 | 11/2003 | Sharpe |
| 6,662,103 B1 | 12/2003 | Skolnick et al. |
| 6,665,683 B1 | 12/2003 | Meltzer |
| 6,674,434 B1 | 1/2004 | Chojnacki et al. |
| 6,714,936 B1 | 3/2004 | Nevin, III |
| 6,742,033 B1 | 5/2004 | Smith et al. |
| 6,757,445 B1 | 6/2004 | Knopp |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,983,203 B1 | 1/2006 | Wako |
| 6,985,950 B1 | 1/2006 | Hanson et al. |
| 7,003,566 B2 | 2/2006 | Codella et al. |
| 7,036,085 B2 | 4/2006 | Barros |
| 7,043,702 B2 | 5/2006 | Chi et al. |
| 7,055,110 B2 | 5/2006 | Kupka et al. |
| 7,086,028 B1 | 8/2006 | Davis et al. |
| 7,103,852 B2 | 9/2006 | Kairis, Jr. |
| 7,139,800 B2 | 11/2006 | Bellotti et al. |
| 7,149,366 B1 | 12/2006 | Sun |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,375,732 B2 | 5/2008 | Arcas |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,426,654 B2 | 9/2008 | Adams et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,457,706 B2 | 11/2008 | Malero et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,519,470 B2 | 4/2009 | Brasche et al. |
| 7,525,422 B2 | 4/2009 | Bishop et al. |
| 7,529,195 B2 | 5/2009 | Gorman |
| 7,529,727 B2 | 5/2009 | Arning et al. |
| 7,529,734 B2 | 5/2009 | Dirisala |
| 7,539,666 B2 | 5/2009 | Ashworth et al. |
| 7,558,677 B2 | 6/2009 | Jones |
| 7,558,822 B2 | 7/2009 | Fredricksen et al. |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,617,314 B1 | 11/2009 | Bansod et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,653,883 B2 | 1/2010 | Hotelling et al. |
| 7,663,621 B1 | 2/2010 | Allen et al. |
| 7,693,816 B2 | 4/2010 | Nemoto et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,747,749 B1 | 6/2010 | Erikson et al. |
| 7,756,843 B1 | 7/2010 | Palmer |
| 7,765,489 B1 | 7/2010 | Shah |
| 7,770,100 B2 | 8/2010 | Chamberlain et al. |
| 7,791,616 B2 | 9/2010 | Ioup et al. |
| 7,800,796 B2 | 9/2010 | Saito |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,872,647 B2 | 1/2011 | Mayer et al. |
| 7,877,421 B2 | 1/2011 | Berger et al. |
| 7,880,921 B2 | 2/2011 | Dattilo et al. |
| 7,890,850 B1 | 2/2011 | Bryar et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 8,085,268 B2 | 4/2011 | Carrino et al. |
| 7,941,321 B2 | 5/2011 | Greenstein et al. |
| 7,941,336 B1 | 5/2011 | Robin-Jan |
| 7,945,852 B1 | 5/2011 | Pilskains |
| 7,949,960 B2 | 5/2011 | Roessler et al. |
| 7,958,147 B1 | 6/2011 | Turner et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,966,199 B1 | 6/2011 | Frasher |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |

(56) References Cited

U.S. PATENT DOCUMENTS

| | | |
|---|---|---|
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,065,080 B2 | 11/2011 | Koch |
| 8,073,857 B2 | 12/2011 | Sreekanth |
| 8,095,434 B1 | 1/2012 | Puttick et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,191,005 B2 | 5/2012 | Baier et al. |
| 8,200,676 B2 | 6/2012 | Frank |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,325,178 B1 | 12/2012 | Doyle, Jr. |
| 8,352,881 B2 | 1/2013 | Champion et al. |
| 8,368,695 B2 | 2/2013 | Howell et al. |
| 8,386,377 B1 | 2/2013 | Xiong et al. |
| 8,396,740 B1 | 3/2013 | Watson |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,510,743 B2 | 8/2013 | Hackborn et al. |
| 8,514,082 B2 | 8/2013 | Cova et al. |
| 8,514,229 B2 | 8/2013 | Cervelli et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B1 | 10/2013 | Falkenborg et al. |
| 8,554,709 B2 | 10/2013 | Goodson et al. |
| 8,560,413 B1 | 10/2013 | Quarterman |
| 8,564,596 B2 | 10/2013 | Carrino et al. |
| 8,577,911 B1 | 11/2013 | Stepinski et al. |
| 8,589,273 B2 | 11/2013 | Creeden et al. |
| 8,599,203 B2 | 12/2013 | Horowitz et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,434 B2 | 1/2015 | Jain et al. |
| 8,938,686 B1 | 1/2015 | Erenrich et al. |
| 8,949,164 B1 | 2/2015 | Mohler |
| 8,983,494 B1 | 3/2015 | Onnen et al. |
| 8,984,390 B2 | 3/2015 | Aymeloglu et al. |
| 9,009,171 B1 | 4/2015 | Grossman et al. |
| 9,009,177 B2 | 4/2015 | Zheng et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,100,428 B1 | 8/2015 | Visbal |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,116,975 B2 | 8/2015 | Shankar et al. |
| 9,129,219 B1 | 9/2015 | Robertson et al. |
| 9,146,125 B2 | 9/2015 | Vulcano et al. |
| 9,165,100 B2 | 10/2015 | Begur et al. |
| 9,280,618 B1 | 3/2016 | Bruce et al. |
| 9,600,146 B2 | 3/2017 | Cervelli et al. |
| 2001/0021936 A1 | 9/2001 | Bertram |
| 2002/0003539 A1 | 1/2002 | Abe |
| 2002/0032677 A1 | 3/2002 | Morgenthaler et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2002/0130907 A1 | 9/2002 | Chi et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036848 A1 | 2/2003 | Sheha et al. |
| 2003/0036927 A1 | 2/2003 | Bowen |
| 2003/0039948 A1 | 2/2003 | Donahue |
| 2003/0052896 A1 | 3/2003 | Higgins et al. |
| 2003/0093755 A1 | 5/2003 | O'Carroll |
| 2003/0103049 A1 | 6/2003 | Kindratenko et al. |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0030492 A1 | 2/2004 | Fox et al. |
| 2004/0032432 A1 | 2/2004 | Baynger |
| 2004/0034570 A1 | 2/2004 | Davis |
| 2004/0039498 A1 | 2/2004 | Ollis et al. |
| 2004/0044648 A1 | 3/2004 | Anfindsen et al. |
| 2004/0064256 A1 | 4/2004 | Barinek et al. |

(56) References Cited

U.S. PATENT DOCUMENTS

| | | |
|---|---|---|
| 2004/0085318 A1 | 5/2004 | Hassler et al. |
| 2004/0095349 A1 | 5/2004 | Bito et al. |
| 2004/0098236 A1 | 5/2004 | Mayer et al. |
| 2004/0111410 A1 | 6/2004 | Burgoon et al. |
| 2004/0111480 A1 | 6/2004 | Yue |
| 2004/0123135 A1 | 6/2004 | Goddard |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | Gorman |
| 2004/0175036 A1 | 9/2004 | Graham |
| 2004/0181554 A1 | 9/2004 | Heckerman et al. |
| 2004/0193600 A1 | 9/2004 | Kaasten et al. |
| 2004/0205492 A1 | 10/2004 | Newsome |
| 2004/0217884 A1 | 11/2004 | Samadani et al. |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0028191 A1 | 2/2005 | Sullivan et al. |
| 2005/0031197 A1 | 2/2005 | Knopp |
| 2005/0034062 A1 | 2/2005 | Bufkin et al. |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0125715 A1 | 6/2005 | Di Franco et al. |
| 2005/0143602 A1 | 6/2005 | Yada et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182502 A1 | 8/2005 | Iyengar |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0223044 A1 | 10/2005 | Ashworth et al. |
| 2005/0246327 A1 | 11/2005 | Yeung et al. |
| 2005/0251786 A1 | 11/2005 | Citron et al. |
| 2005/0267652 A1 | 12/2005 | Allstadt et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0047804 A1 | 3/2006 | Fredricksen et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080283 A1 | 4/2006 | Shipman |
| 2006/0080619 A1 | 4/2006 | Carlson et al. |
| 2006/0093222 A1 | 5/2006 | Saffer et al. |
| 2006/0129191 A1 | 6/2006 | Sullivan et al. |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0146050 A1 | 7/2006 | Yamauchi |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0200384 A1 | 9/2006 | Arutunian et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0251307 A1 | 11/2006 | Florin et al. |
| 2006/0259527 A1 | 11/2006 | Devarakonda et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2006/0294223 A1 | 12/2006 | Glasgow et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0016435 A1 | 1/2007 | Bevington |
| 2007/0024620 A1 | 2/2007 | Muller-Fischer et al. |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0115373 A1 | 5/2007 | Gallagher et al. |
| 2007/0136095 A1 | 6/2007 | Weinstein |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0185894 A1 | 8/2007 | Swain et al. |
| 2007/0188516 A1 | 8/2007 | Loup et al. |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0258642 A1 | 11/2007 | Thota |
| 2007/0266336 A1 | 11/2007 | Nojima et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0010605 A1 | 1/2008 | Frank |
| 2008/0016155 A1 | 1/2008 | Khalatian |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0066052 A1 | 3/2008 | Wolfram |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0082578 A1 | 4/2008 | Hogue et al. |
| 2008/0091693 A1 | 4/2008 | Murthy |
| 2008/0098085 A1 | 4/2008 | Krane et al. |
| 2008/0103996 A1 | 5/2008 | Forman et al. |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0133579 A1 | 6/2008 | Lim |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0163073 A1 | 7/2008 | Becker et al. |

(56) References Cited

U.S. PATENT DOCUMENTS

| | | |
|---|---|---|
| 2008/0172607 A1 | 7/2008 | Baer |
| 2008/0177782 A1 | 7/2008 | Poston et al. |
| 2008/0192053 A1 | 8/2008 | Howell et al. |
| 2008/0195417 A1 | 8/2008 | Surpin et al. |
| 2008/0195474 A1 | 8/2008 | Lau et al. |
| 2008/0195608 A1 | 8/2008 | Clover |
| 2008/0208735 A1 | 8/2008 | Balet et al. |
| 2008/0222295 A1 | 9/2008 | Robinson et al. |
| 2008/0223834 A1 | 9/2008 | Griffiths et al. |
| 2008/0229056 A1 | 9/2008 | Agarwal et al. |
| 2008/0243711 A1 | 10/2008 | Aymeloglu et al. |
| 2008/0249820 A1 | 10/2008 | Pathria |
| 2008/0249983 A1 | 10/2008 | Meisels et al. |
| 2008/0255871 A1* | 10/2008 | Wenzlau ............ G06Q 10/06 705/1.1 |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0012803 A1* | 1/2009 | Bishop, III ............ G06Q 50/16 705/323 |
| 2009/0026170 A1 | 1/2009 | Tanaka et al. |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0094166 A1 | 4/2009 | Aymeloglu et al. |
| 2009/0094187 A1 | 4/2009 | Miyaki |
| 2009/0094270 A1 | 4/2009 | Alirez et al. |
| 2009/0100018 A1 | 4/2009 | Roberts |
| 2009/0106178 A1 | 4/2009 | Chu |
| 2009/0112678 A1 | 4/2009 | Luzardo |
| 2009/0112745 A1 | 4/2009 | Stefanescu |
| 2009/0115786 A1 | 5/2009 | Shmiasaki et al. |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0157732 A1 | 6/2009 | Hao et al. |
| 2009/0158185 A1 | 6/2009 | Lacevic et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0199106 A1 | 8/2009 | Jonsson et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0248593 A1 | 10/2009 | Putzolu et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0276290 A1* | 11/2009 | Sill ............ G06Q 10/06393 705/7.39 |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1* | 12/2009 | MacKinlay ............ G06T 11/00 715/275 |
| 2010/0011282 A1 | 1/2010 | Dollard et al. |
| 2010/0016910 A1 | 1/2010 | Sullivan et al. |
| 2010/0030722 A1 | 2/2010 | Goodson et al. |
| 2010/0031141 A1 | 2/2010 | Summers et al. |
| 2010/0031183 A1 | 2/2010 | Kang |
| 2010/0042922 A1 | 2/2010 | Bradateanu et al. |
| 2010/0049872 A1 | 2/2010 | Roskind |
| 2010/0057622 A1 | 3/2010 | Faith et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076968 A1 | 3/2010 | Boyns et al. |
| 2010/0088304 A1 | 4/2010 | Jackson |
| 2010/0088398 A1 | 4/2010 | Plamondon |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106420 A1 | 4/2010 | Mattikalli et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0185692 A1 | 7/2010 | Zhang et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0223260 A1 | 9/2010 | Wu |
| 2010/0228812 A1 | 9/2010 | Uomini |
| 2010/0235915 A1 | 9/2010 | Memon et al. |
| 2010/0238174 A1 | 9/2010 | Haub et al. |
| 2010/0250412 A1 | 9/2010 | Wagner |
| 2010/0262688 A1 | 10/2010 | Hussain et al. |
| 2010/0262901 A1 | 10/2010 | DiSalvo |
| 2010/0277611 A1 | 11/2010 | Holt et al. |
| 2010/0280851 A1 | 11/2010 | Merkin |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0306722 A1 | 12/2010 | LeHoty et al. |
| 2010/0312837 A1 | 12/2010 | Bodapati et al. |
| 2010/0312858 A1 | 12/2010 | Mickens et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0321871 A1 | 12/2010 | Diebel et al. |
| 2010/0325526 A1 | 12/2010 | Ellis et al. |
| 2010/0325581 A1 | 12/2010 | Finkelstein et al. |
| 2010/0328112 A1 | 12/2010 | Liu |
| 2010/0330801 A1 | 12/2010 | Rouh |
| 2010/0332324 A1 | 12/2010 | Khosravy et al. |
| 2011/0004498 A1 | 1/2011 | Readshaw |
| 2011/0022312 A1 | 1/2011 | McDonough et al. |
| 2011/0029526 A1 | 2/2011 | Knight et al. |
| 2011/0029641 A1 | 2/2011 | Fainberg et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |

(56) References Cited

U.S. PATENT DOCUMENTS

| | | |
|---|---|---|
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0090085 A1 | 4/2011 | Belz et al. |
| 2011/0090254 A1 | 4/2011 | Carrino et al. |
| 2011/0093327 A1 | 4/2011 | Fordyce et al. |
| 2011/0099046 A1* | 4/2011 | Weiss ............... G06Q 10/00 705/7.31 |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0125372 A1 | 5/2011 | Ito |
| 2011/0137766 A1 | 6/2011 | Rasmussen et al. |
| 2011/0153368 A1 | 6/2011 | Pierre et al. |
| 2011/0153384 A1 | 6/2011 | Horne et al. |
| 2011/0161096 A1 | 6/2011 | Buehler et al. |
| 2011/0161409 A1 | 6/2011 | Nair |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |
| 2011/0238690 A1 | 9/2011 | Arrasvuori et al. |
| 2011/0251951 A1 | 10/2011 | Kolkowtiz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004894 A1 | 1/2012 | Butler |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1* | 4/2012 | Tavares ........... G06Q 30/0201 705/7.29 |
| 2012/0084118 A1 | 4/2012 | Bai et al. |
| 2012/0084184 A1 | 4/2012 | Raleigh |
| 2012/0084287 A1 | 4/2012 | Lakshminarayan et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0137235 A1 | 5/2012 | Ts et al. |
| 2012/0144325 A1 | 6/2012 | Mital et al. |
| 2012/0144335 A1 | 6/2012 | Abeln et al. |
| 2012/0158527 A1 | 6/2012 | Cannelongo et al. |
| 2012/0159307 A1 | 6/2012 | Chung et al. |
| 2012/0159362 A1 | 6/2012 | Brown et al. |
| 2012/0159363 A1 | 6/2012 | DeBacker et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0206469 A1 | 8/2012 | Hulubei et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2011/0323888 | 12/2012 | Osann, Jr. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1* | 1/2013 | Yip .................. G06T 11/206 345/440 |
| 2013/0018796 A1 | 1/2013 | Kolhatkar et al. |
| 2013/0021445 A1 | 1/2013 | Cossette-Pacheco et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0076732 A1 | 3/2013 | Cervelli et al. |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0100134 A1 | 4/2013 | Cervelli et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0132398 A1 | 5/2013 | Pfiefle |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1* | 6/2013 | Scotto ............. G06Q 30/0205 705/7.29 |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |

(56) References Cited

U.S. PATENT DOCUMENTS

| | | |
|---|---|---|
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0254900 A1 | 9/2013 | Sathish et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282723 A1 | 10/2013 | Petersen et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0339891 A1 | 12/2013 | Blumenberg et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0033120 A1 | 1/2014 | Bental et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0129936 A1 | 5/2014 | Richards et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0218400 A1 | 8/2014 | O'Toole et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244284 A1 | 8/2014 | Smith |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0361899 A1 | 12/2014 | Layson |
| 2014/0365965 A1 | 12/2014 | Bray et al. |
| 2014/0366132 A1 | 12/2014 | Stiansen et al. |
| 2015/0019394 A1 | 1/2015 | Unser et al. |
| 2015/0026622 A1 | 1/2015 | Roaldson et al. |
| 2015/0029176 A1 | 1/2015 | Baxter et al. |
| 2015/0046870 A1 | 2/2015 | Goldenberg et al. |
| 2015/0073929 A1 | 3/2015 | Psota et al. |
| 2015/0073954 A1* | 3/2015 | Braff ................. G06Q 30/00 705/30 |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106170 A1 | 4/2015 | Bonica |
| 2015/0106379 A1 | 4/2015 | Elliot et al. |
| 2015/0134666 A1 | 5/2015 | Gattiker et al. |
| 2015/0135256 A1 | 5/2015 | Hoy et al. |
| 2015/0169709 A1 | 6/2015 | Kara et al. |
| 2015/0169726 A1 | 6/2015 | Kara et al. |
| 2015/0170077 A1* | 6/2015 | Kara ................ G06F 17/30554 705/7.38 |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0188872 A1 | 7/2015 | White |
| 2015/0212663 A1 | 7/2015 | Papale et al. |
| 2015/0227295 A1 | 8/2015 | Meiklejohn et al. |
| 2015/0254220 A1 | 9/2015 | Burr et al. |
| 2015/0309719 A1 | 10/2015 | Ma et al. |
| 2015/0312323 A1 | 10/2015 | Peterson |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0055501 A1 | 2/2016 | Mukherjee et al. |
| 2016/0062555 A1 | 3/2016 | Ward et al. |
| 2017/0052654 A1 | 2/2017 | Cervelli et al. |
| 2017/0052655 A1 | 2/2017 | Cervelli et al. |
| 2017/0052747 A1 | 2/2017 | Cervelli et al. |

FOREIGN PATENT DOCUMENTS

| | | |
|---|---|---|
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102013222023 | 1/2015 |
| DE | 102014215621 | 2/2015 |
| EP | 0763201 | 3/1997 |
| EP | 1672527 | 6/2006 |
| EP | 2487610 | 8/2012 |
| EP | 2551799 | 1/2013 |
| EP | 2560134 | 2/2013 |
| EP | 2575107 | 4/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |

(56) References Cited

FOREIGN PATENT DOCUMENTS

| | | |
|---|---|---|
| EP | 2892197 | 7/2015 |
| EP | 2911078 | 8/2015 |
| EP | 2911100 | 8/2015 |
| EP | 2940603 | 11/2015 |
| EP | 2940609 | 11/2015 |
| EP | 2963595 | 1/2016 |
| EP | 2988258 | 2/2016 |
| EP | 2993595 | 3/2016 |
| EP | 3070622 | 9/2016 |
| EP | 3133510 | 2/2017 |
| EP | 3139333 | 3/2017 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 95/032424 | 11/1995 |
| WO | WO 2000/009529 | 2/2000 |
| WO | WO 01/025906 | 4/2001 |
| WO | WO 2001/088750 | 11/2001 |
| WO | WO 2001/098925 | 12/2001 |
| WO | WO 2002/065353 | 8/2002 |
| WO | WO 2004/057268 | 7/2004 |
| WO | WO 2005/013200 | 2/2005 |
| WO | WO 2005/104736 | 11/2005 |
| WO | WO 2005/116851 | 12/2005 |
| WO | WO 2007/133206 | 11/2007 |
| WO | WO 2008/064207 | 5/2008 |
| WO | WO 2009/016501 | 5/2009 |
| WO | WO 2009/061501 | 5/2009 |
| WO | WO 2009/123975 | 10/2009 |
| WO | WO 2010/000014 | 1/2010 |
| WO | WO 2010/030913 | 3/2010 |
| WO | WO 2010/030914 | 3/2010 |
| WO | WO 2011/058507 | 5/2011 |
| WO | WO 2012/119008 | 9/2012 |
| WO | WO 2013/010157 | 1/2013 |
| WO | WO 2013/102892 | 7/2013 |

OTHER PUBLICATIONS

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Cohn et al., "Semi-supervised Clustering with User Feedback," Constrained Clustering: Advances in Algorithms, Theory, and Applications 4.1, 2003, pp. 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation," Grant 98-IJ-CX-K005, May 6, 2002, 37 pages.

Gu et al., "Record Linkage: Current Practice and Future Directions," Jan. 15, 2004, pp. 32.

Hansen et al. "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services" HiPC 2006, LNCS 4297, pp. 277-288, 2006.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kontagent Mobile Analytics, <http://www.kontagent.com/> Printed Jul. 18, 2013 in 9 pages.

Localytics—Mobile App Marketing & Analytics, <http://www.localytics.com/> Printed Jul. 18, 2013 in 12 pages.

Manno et al., "Introducing Collaboration in Single-user Applications through the Centralized Control Architecture," 2010, pp. 10.

Mixpanel—Mobile Analytics, <https://mixpanel.com/> Printed Jul. 18, 2013 in 13 pages.

Open Web Analytics (OWA), <http://www.openwebanalytics.com/> Printed Jul. 19, 2013 in 5 pages.

Piwik—Free Web Analytics Software. <http://piwik.org/> Printed Jul. 19, 2013 in18 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Sigrist et al., "PROSITE, a Protein Domain Database for Functional Characterization and Annotation," Nucleic Acids Research 38.Suppl 1, 2010, pp. D161-D166.

StatCounter—Free Invisible Web Tracker, Hit Counter and Web Stats, <http://statcounter.com/> Printed Jul. 19, 2013 in 17 pages.

TestFlight—Beta Testing on the Fly, <http://testflightapp.com/> Printed Jul. 18, 2013 in 3 pages.

trak.io, <http://trak.io/> printed Jul. 18, 2013 in 3 pages.

UserMetrix, <http://usermetrix.com/android-analytics> printed Jul. 18, 2013 in 3 pages.

Valentini et al., "Ensembles of Learning Machines," M. Marinaro and R. Tagliaferri (Eds.): WIRN VIETRI 2002, LNCS 2486, pp. 3-20.

Vose et al., "Help File for ModelRisk Version 5," 2007, Vose Software, pp. 349-353. [Uploaded in 2 Parts].

Wang et al., "Research on a Clustering Data De-Duplication Mechanism Based on Bloom Filter," IEEE 2010, 5 pages.

Notice of Allowance for U.S. Appl. No. 14/479,863 dated Mar. 31, 2015.

Notice of Allowance for U.S. Appl. No. 14/225,084 dated May 4, 2015.

Notice of Allowance for U.S. Appl. No. 14/319,161 dated May 4, 2015.

Official Communication for U.S. Appl. No. 14/225,160 dated Jul. 29, 2014.

Official Communication for U.S. Appl. No. 14/225,084 dated Sep. 2, 2014.

Official Communication for U.S. Appl. No. 14/225,006 dated Sep. 10, 2014.

Official Communication for U.S. Appl. No. 14/451,221 dated Oct. 21, 2014.

Official Communication for U.S. Appl. No. 14/225,160 dated Oct. 22, 2014.

Official Communication for U.S. Appl. No. 14/463,615 dated Nov. 13, 2014.

Official Communication for U.S. Appl. No. 13/827,491 dated Dec. 1, 2014.

Official Communication for U.S. Appl. No. 14/479,863 dated Dec. 26, 2014.

(56) References Cited

OTHER PUBLICATIONS

Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/225,160 dated Feb. 11, 2015.
Official Communication for U.S. Appl. No. 14/225,006 dated Feb. 27, 2015.
Official Communication for U.S. Appl. No. 14/571,098 dated Mar. 11, 2015.
Official Communication for U.S. Appl. No. 14/225,160 dated May 20, 2015.
Official Communication for U.S. Appl. No. 14/463,615 dated May 21, 2015.
Official Communication for U.S. Appl. No. 13/827,491 dated Jun. 22, 2015.
Official Communication for U.S. Appl. No. 14/483,527 dated Jun. 22, 2015.
Official Communication for U.S. Appl. No. 14/552,336 dated Jul. 20, 2015.
Official Communication for U.S. Appl. No. 14/676,621 dated Jul. 30, 2015.
Official Communication for U.S. Appl. No. 14/571,098 dated Aug. 5, 2015.
Official Communication for U.S. Appl. No. 14/225,160 dated Aug. 12, 2015.
Official Communication for U.S. Appl. No. 14/571,098 dated Aug. 24, 2015.
Official Communication for U.S. Appl. No. 14/225,006 dated Sep. 2, 2015.
Official Communication for U.S. Appl. No. 14/631,633 dated Sep. 10, 2015.
Official Communication for U.S. Appl. No. 14/463,615 dated Sep. 10, 2015.
Official Communication for U.S. Appl. No. 14/225,084 dated Sep. 11, 2015.
Official Communication for U.S. Appl. No. 14/562,524 dated Sep. 14, 2015.
Official Communication for U.S. Appl. No. 14/813,749 dated Sep. 28, 2015.
Official Communication for U.S. Appl. No. 14/746,671 dated Sep. 28, 2015.
Official Communication for U.S. Appl. No. 13/827,491 dated Oct. 9, 2015.
Official Communication for European Patent Application No. 14187996.5 dated Feb. 12, 2015.
Official Communication for European Patent Application No. 14200298.9 dated May 13, 2015.
Official Communication for European Patent Application No. 14191540.5 dated May 27, 2015.
Official Communication for European Patent Application No. 15181419.1 dated Sep. 29, 2015.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622473 dated Jun. 19, 2014.
Official Communication for New Zealand Patent Application No. 628161 dated Aug. 25, 2014.
"A First Look: Predicting Market Demand for Food Retail using a Huff Analysis," TRF Policy Solutions, Jul. 2012, pp. 30.
"Andy Turner's GISRUK 2012 Notes" <https://docs.google.com/document/d/1cTmxg7mVx5gd891qb1CYvCEnHA4QAivH414WpyPsqE4/edit?pli=1 > printed Sep. 16, 2013 in 15 pages.
Barnes et al., "Viewshed Analysis", GIS-ARC/INFO 2001, <www.evsc.virginia.edu/~jhp7e/evsc466/student_pres/Rounds.pdf>.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Chaudhuri et al., "An Overview of Business Intelligence Technology," Communications of the ACM, Aug. 2011, vol. 54, No. 8.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Definition—Identify, downloaded Jan. 22, 2015, 1 page.
Definition—Overlay, downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Griffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
HunchLab: Heat Map and Kernel Density Calculation for Crime Analysis,åÓ Azavea Journal, printed from www.azavea.com/blogs/newsletter/v4i4/kernel-density-capabilities-added-to-hunchlab/ on Sep. 9, 2014, 2 pages.
Ipbucker, C., "Inverse Transformation for Several Pseudo-cylindrical Map Projections Using Jacobian Matrix," ICCSA 2009, Part 1 LNCS 5592, pp. 553-564.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," <http://www-users.cs.umn.edu/~npramod/enc_pdf.pdf> retrieved Jan. 28, 2010, pp. 7.

(56) References Cited

OTHER PUBLICATIONS

Map Builder, "Rapid Mashup Development Tool for Google and Yahoo Maps!" <http://web.archive.org/web/20090626224734/http://www.mapbuilder.net/> printed Jul. 20, 2012 in 2 pages.

Map of San Jose, CA. Retrieved Oct. 2, 2013 from http://maps.bing.com.

Map of San Jose, CA. Retrieved Oct. 2, 2013 from http://maps.google.com.

Map of San Jose, CA. Retrieved Oct. 2, 2013 from http://maps.yahoo.com.

Murray, C., Oracle Spatial Developer's Guide-6 Coordinate Systems (Spatial Reference Systems), <http://docs.oracle.com/cd/B28359_01/appdev.111/b28400.pdf>, Jun. 2009.

Open Street Map, "Amm's Diary:Unconnected ways and other data quality issues," http://www.openstreetmap.org/user/amm/diary printed Jul. 23, 2012 in 3 pages.

POI Editor, "How to: Create Your Own Points of Interest," <http://www.poieditor.com/articles/how_to_create_your_own_points_of_interest/> printed Jul. 22, 2012 in 4 pages.

Pozzi et al., "Vegetation and Population Density in Urban and Suburban Areas in the U.S.A." Third International Symposium of Remote Sensing of Urban Areas Istanbul, Turkey, Jun. 2002, pp. 8.

Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.

Reibel et al., "Areal Interpolation of Population Counts Using Pre-classi_ed Land Cover Data," Population Research and Policy Review, 2007, vol. 26, pp. 619-633.

Reibel, M., "Geographic Information Systems and Spatial Data Processing in Demography: a Review," Population Research and Policy Review, 2007, vol. 26, pp. 601-618.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Snyder, "Map Projections—A Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state.la.us/gis/instruct_files/tutslide12> printed Jan. 3, 2013 in 1 page.

Tangelder et al., "Freeform Shape Matching Using Minkowski Operations," The Netherlands, Jun. 1996, pp. 12.

Thompson, Mick, "Getting Started with GEO," Getting Started with GEO, Jul. 26, 2011.

VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions.com/jts/bin/JTS%20Technical%20Specs.pdf> Version 1.4, 2003, pp. 36.

Wikipedia, "Douglas_Peucker-Algorithms," <http://de.wikipedia.org/w/index.php?title=Douglas-Peucker-Algorithmus&oldid=91846042> printed Jul. 2011, pp. 2.

Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.

Wikipedia, "Multimap," Jan. 1, 2013, https://en.wikipedia.org/w/index.php?title=Multimap&oldid=530800748.

Wongsuphasawat et al., â-Visual Analytics for Transportation Incident Data Sets,âÖ Transportation Research Record 2138, 2009, pp. 135-145.

Woodbridge, Stephen, "[geos-devel] Polygon simplification," <http://lists.osgeo.org/pipermail/geos-devel/2011-May/005210.html> dated May 8, 2011, pp. 3.

Issue Notification for U.S. Appl. No. 13/917,571 dated Aug. 5, 2014.

Notice of Allowance for U.S. Appl. No. 13/948,859 dated Dec. 10, 2014.

Notice of Allowance for U.S. Appl. No. 14/294,098 dated Dec. 29, 2014.

Notice of Allowance for U.S. Appl. No. 12/840,673 dated Apr. 6, 2015.

Notice of Allowance for U.S. Appl. No. 14/323,935 dated Oct. 1, 2015.

Notice of Allowance for U.S. Appl. No. 14/552,336 dated Nov. 3, 2015.

Notice of Allowance for U.S. Appl. No. 14/746,671 dated Jan. 21, 2016.

Notice of Allowance for U.S. Appl. No. 14/730,123 dated Apr. 12, 2016.

Official Communication for U.S. Appl. No. 14/289,596 dated Jul. 18, 2014.

Official Communication for U.S. Appl. No. 14/289,599 dated Jul. 22, 2014.

Official Communication for U.S. Appl. No. 14/294,098 dated Aug. 15, 2014.

Official Communication for U.S. Appl. No. 12/840,673 dated Sep. 17, 2014.

Official Communication for U.S. Appl. No. 14/294,098 dated Nov. 6, 2014.

Official Communication for U.S. Appl. No. 12/840,673 dated Jan. 2, 2015.

Official Communication for U.S. Appl. No. 14/289,596 dated Jan. 26, 2015.

Official Communication for U.S. Appl. No. 13/728,879 dated Jan. 27, 2015.

Official Communication for U.S. Appl. No. 13/728,879 dated Mar. 17, 2015.

Official Communication for U.S. Appl. No. 14/289,596 dated Apr. 30, 2015.

Official Communication for U.S. Appl. No. 14/289,599 dated May 29, 2015.

Official Communication for U.S. Appl. No. 13/728,879 dated Aug. 12, 2015.

Official Communication for U.S. Appl. No. 14/490,612 dated Aug. 18, 2015.

Official Communication for U.S. Appl. No. 14/289,599 dated Sep. 4, 2015.

Official Communication for U.S. Appl. No. 14/730,123 dated Sep. 21, 2015.

Official Communication for U.S. Appl. No. 14/141,252 dated Oct. 8, 2015.

Official Communication for U.S. Appl. No. 14/483,527 dated Oct. 28, 2015.

Official Communication for U.S. Appl. No. 14/676,621 dated Oct. 29, 2015.

Official Communication for U.S. Appl. No. 14/571,098 dated Nov. 10, 2015.

Official Communication for U.S. Appl. No. 14/562,524 dated Nov. 10, 2015.

Official Communication for U.S. Appl. No. 14/746,671 dated Nov. 12, 2015.

Official Communication for U.S. Appl. No. 14/842,734 dated Nov. 19, 2015.

Official Communication for U.S. Appl. No. 13/728,879 dated Nov. 20, 2015.

Official Communication for U.S. Appl. No. 14/306,138 dated Dec. 3, 2015.

Official Communication for U.S. Appl. No. 14/463,615 dated Dec. 9, 2015.

Official Communication for U.S. Appl. No. 14/800,447 dated Dec. 10, 2015.

Official Communication for U.S. Appl. No. 14/225,006 dated Dec. 21, 2015.

Official Communication for U.S. Appl. No. 14/306,138 dated Dec. 24, 2015.

(56) References Cited

OTHER PUBLICATIONS

Official Communication for U.S. Appl. No. 14/306,147 dated Dec. 24, 2015.
Official Communication for U.S. Appl. No. 14/225,084 dated Jan. 4, 2016.
Official Communication for U.S. Appl. No. 14/306,154 dated Feb. 1, 2016.
Official Communication for U.S. Appl. No. 14/929,584 dated Feb. 4, 2016.
Official Communication for U.S. Appl. No. 14/934,004 dated Feb. 16, 2016.
Official Communication for U.S. Appl. No. 14/562,524 dated Feb. 18, 2016.
Official Communication for U.S. Appl. No. 14/800,447 dated Mar. 3, 2016.
Official Communication for U.S. Appl. No. 14/306,147 dated Mar. 4, 2016.
Official Communication for U.S. Appl. No. 14/306,138 dated Mar. 17, 2016.
Official Communication for U.S. Appl. No. 14/306,154 dated Mar. 17, 2016.
Official Communication for U.S. Appl. No. 14/463,615 dated Mar. 21, 2016.
Official Communication for U.S. Appl. No. 14/289,596 dated May 9, 2016.
Official Communication for U.S. Appl. No. 14/463,615 dated May 12, 2016.
Official Communication for U.S. Appl. No. 14/929,584 dated May 25, 2016.
Notice of Acceptance for Australian Patent Application No. 2012216622 dated Jan. 6, 2015.
Official Communication for Australian Patent Application No. 2014202442 dated Mar. 19, 2015.
Official Communication for Australian Patent Application No. 2014213553 dated May 7, 2015.
Official Communication for European Patent Application No. 14200246.8 dated May 29, 2015.
Official Communication for European Patent Application No. 14187739.9 dated Jul. 6, 2015.
Official Communication for European Patent Application No. 15184764.7 dated Dec. 14, 2015.
Official Communication for Netherlands Patent Application No. 2012421 dated Sep. 18, 2015.
Official Communication for Netherlands Patent Application No. 2012417 dated Sep. 18, 2015.
Official Communication for Netherlands Patent Application No. 2012438 dated Sep. 21, 2015.
Official Communication for Netherlands Patent Application No. 2012778 dated Sep. 22, 2015.
Official Communication for Netherlands Patent Application No. 2011632 dated Feb. 8, 2016.
Official Communication for United Kingdom Patent Application No. 1404499.4 dated Aug. 20, 2014.
Official Communication for United Kingdom Patent Application No. 1404489.5 dated Aug. 27, 2014.
Official Communication for United Kingdom Patent Application No. 1404486.1 dated Aug. 27, 2014.
Official Communication for United Kingdom Patent Application No. 1404499.4 dated Sep. 29, 2014.
Official Communication for United Kingdom Patent Application No. 1404489.5 dated Oct. 6, 2014.
Official Communication for United Kingdom Patent Application No. 1408025.3 dated Nov. 6, 2014.
Official Communication for New Zealand Patent Application No. 628585 dated Aug. 26, 2014.
Official Communication for New Zealand Patent Application No. 628840 dated Aug. 28, 2014.
"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
Abbey, Kristen, "Review of Google Docs," May 1, 2007, pp. 2.
About 80 Minutes, "Palantir in a Number of Parts—Part 6—Graph," Mar. 21, 2013, pp. 1-6.
Acklen, Laura, "Absolute Beginner's Guide to Microsoft Word 2003," Dec. 24, 2003, pp. 15-18, 34-41, 308-316.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Alur et al., "Chapter 2: IBM InfoSphere DataStage Stages," IBM InfoSphere DataStage Data Flow and Job Design, Jul. 1, 2008, pp. 35-137.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Delcher et al., "Identifying Bacterial Genes and Endosymbiont DNA with Glimmer," BioInformatics, vol. 23, No. 6, 2007, pp. 673-679.
"The FASTA Program Package," fasta-36.3.4, Mar. 25, 2011, pp. 29.
Galliford, Miles, "SnagIt Versus Free Screen Capture Software: Critical Tools for Website Owners," <http://www.subhub.com/articles/free-screen-capture-software>, Mar. 27, 2008, pp. 11.
Gesher, Ari, "Palantir Screenshots in the Wild: Swing Sightings," The Palantir Blog, Sep. 11, 2007, pp. 1-12.
Goswami, Gautam, "Quite Writly Seidl," One Brick at a Time, Aug. 21, 2005, pp. 7.
"GrabUp—What a Timesaver!" <http://atlchris.com/191/grabup/>, Aug. 11, 2008, pp. 3.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
JetScreenshot.com, "Share Screenshots via Internet in Seconds," <http://web.archive.org/web/20130807164204/http://www.jetscreenshot.com/>, Aug. 7, 2013, pp. 1.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Kitts, Paul, "Chapter 14: Genome Assembly and Annotation Process," The NCBI Handbook, Oct. 2002, pp. 1-21.
Kwout, <http://web.archive.org/web/20080905132448/http://www.kwout.com/> Sep. 5, 2008, pp. 2.
Li et al., "Interactive Multimodal Visual Search on Mobile Device," IEEE Transactions on Multimedia, vol. 15, No. 3, Apr. 1, 2013, pp. 594-607.
Madden, Tom, "Chapter 16: The BLAST Sequence Analysis Tool," The NCBI Handbook, Oct. 2002, pp. 1-15.
Manske, "File Saving Dialogs," <http://www.mozilla.org/editor/ui_specs/FileSaveDialogs.html>, Jan. 20, 1999, pp. 7.

(56) References Cited

OTHER PUBLICATIONS

Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mizrachi, Ilene, "Chapter 1: GenBank: The Nuckeotide Sequence Database," The NCBI Handbook, Oct. 2002, pp. 1-14.
"Money Laundering Risks and E-Gaming: A European Overview and Assessment," 2009, http://www.cf.ac.uk/socsi/resources/Levi_Final_Money_Laundering_Risks_egaming.pdf.
Nierman, "Evaluating Structural Similarity in XML Documents", 6 pages, 2002.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, http://oreilly.com/digitalmedia/2006/01/01/mac-os-x-screenshot-secrets.html published Jan. 1, 2006 in 10 pages.
Palantir Technologies, "Palantir Labs_Timeline," Oct. 1, 2010, retrieved from the internet https://www.youtube.com/watch?v=JCgDW5bru9M.
Palmas et al. "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
Quest, "Toad for ORACLE 11.6—Guide to Using Toad," Sep. 24, 2012, pp. 1-162.
Rouse, Margaret, "OLAP Cube," <http://searchdatamanagement.techtarget.com/definition/OLAP-cube>, Apr. 28, 2012, pp. 16.
Schroder, Stan, "15 Ways to Create Website Screenshots," <http://mashable.com/2007/08/24/web-screenshots/>, Aug. 24, 2007, pp. 2.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sirotkin et al., "Chapter 13: The Processing of Biological Sequence Data at NCBI," The NCBI Handbook, Oct. 2002, pp. 1-11.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Symantec Corporation, "E-Security Begins with Sound Security Policies," Announcement Symantec, Jun. 14, 2001.
Umagandhi et al., "Search Query Recommendations Using Hybrid User Profile with Query Logs," International Journal of Computer Applications, vol. 80, No. 10, Oct. 1, 2013, pp. 7-18.
"Using Whois Based Geolocation and Google Maps API for Support Cybercrime Investigations," http://wseas.us/e-library/conferences/2013/Dubrovnik/TELECIRC/TELECIRC-32.pdf.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Federated Database System," Sep. 7, 2013, retrieved from the internet on Jan. 27, 2015 http://en.wikipedia.org/w/index.php?title=Federated_database_system&oldid=571954221.
Wright et al. "Palantir Technologies VAST 2010 Challenge Text Records_Investigations into Arms Dealing," Oct. 29, 2010, pp. 1-10.
Yang et al., "HTML Page Analysis Based on Visual Cues", A129, pp. 859-864, 2001.
Notice of Acceptance for Australian Patent Application No. 2013251186 dated Nov. 6, 2015.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 13/728,879 dated Jun. 21, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/265,637 dated Feb. 13, 2015.
Notice of Allowance for U.S. Appl. No. 14/268,964 dated Dec. 3, 2014.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/504,103 dated May 18, 2015.
Notice of Allowance for U.S. Appl. No. 14/616,080 dated Apr. 2, 2015.
Notice of Allowance for U.S. Appl. No. 14/934,004 dated Nov. 4, 2016.
Official Communication for Australian Patent Application No. 2013251186 dated Mar. 12, 2015.
Official Communication for Australian Patent Application No. 2014201511 dated Feb. 27, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014250678 dated Jun. 17, 2015.
Official Communication for Canadian Patent Application No. 2831660 dated Jun. 9, 2015.
Official Communication for European Patent Application No. 12181585.6 dated Sep. 4, 2015.

(56) References Cited

OTHER PUBLICATIONS

Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for European Patent Application No. 15188106.7 dated Feb. 3, 2016.
Official Communication for European Patent Application No. 15190307.7 dated Feb. 19, 2016.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2011729 dated Aug. 13, 2015.
Official Communication for Netherlands Patent Application No. 2012437 dated Sep. 18, 2015.
Official Communication for Netherlands Patent Application No. 2013306 dated Apr. 24, 2015.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628263 dated Aug. 12, 2014.
Official Communication for New Zealand Patent Application No. 628495 dated Aug. 19, 2014.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/222,364 dated Dec. 9, 2015.
Official Communication for U.S. Appl. No. 14/265,637 dated Sep. 26, 2014.
Official Communication for U.S. Appl. No. 14/268,964 dated Sep. 3, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.

(56) References Cited

OTHER PUBLICATIONS

Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/715,834 dated Feb. 19, 2016.
Official Communication for U.S. Appl. No. 14/726,353 dated Sep. 10, 2015.
Official Communication for U.S. Appl. No. 14/841,338 dated Feb. 18, 2016.
Official Communication for U.S. Appl. No. 14/871,465 dated Feb. 9, 2016.
Official Communication for U.S. Appl. No. 14/883,498 dated Mar. 17, 2016.
Official Communication for U.S. Appl. No. 14/883,498 dated Dec. 24, 2015.
Official Communication for U.S. Appl. No. 14/934,004 dated Jul. 29, 2016.
Official Communication for U.S. Appl. No. 15/072,133 dated Nov. 10, 2016.
Official Communication for U.S. Appl. No. 15/072,133 dated Mar. 17, 2017.
Restriction Requirement for U.S. Appl. No. 13/839,026 dated Apr. 2, 2015.
Ask Drexel University Knowledge Base, "How to: Auto Save a Document Before Printing in Word 2007," published Nov. 13, 2007.
Harville et al., "Mediabeads: An Architecture for Path-Enhanced Media Applications," 2004 IEEE International Conference on Multimedia and Expo, Jun. 27-30, 2004, Taipei, Taiwan, vol. 1, pp. 455-458.
MacWright, Tom, "Announcing MapBOx.JS 1.0 with Leaflet," Mapbox.com blog, Apr. 18, 2013, retrieved from https://www.mapbox.com/blog/mapbox-js-with-leaflet/.
Palantir, "Basic Map Searches," YouTube, 12 Sep. 2013, retrieved from https://www.youtube.com/watch?v=UC-1x44xFR0.
Palantir, "Intelligence Integration in Palantir: An Open-Source View of the Afghan Conflict," YouTube, Jul. 5, 2012, retrieved from https://www.youtube.com/watch?v=FXTxs2YqHY4.
"What Was It Again? Ways to Make Feature Tile Layers Interactive," WordPress.com, published Jun. 12, 2011, retrieved from https://whatwasitagain.wordpress.com/2011/06/12/interactive-feature-tile-layers/.
International Search Report and Written Opinion in Application No. PCT/US2009/056703 dated Mar. 15, 2010.
Notice of Allowance for U.S. Appl. No. 14/319,765 dated Nov. 25, 2016.
Notice of Allowance for U.S. Appl. No. 14/323,881 dated Jun. 30, 2017.
Notice of Allowance for U.S. Appl. No. 14/486,991 dated May 1, 2015.
Notice of Allowance for U.S. Appl. No. 15/072,133 dated Jun. 23, 2017.
Official Communication for Australian Patent Application No. 2010227081 dated Mar. 18, 2011.
Official Communication for Australian Patent Application No. 2010257305 dated Apr. 12, 2011.
Official Communication for Australian Patent Application No. 2010257305 dated Sep. 22, 2011.
Official Communication for European Patent Application No. 10195798.3 dated May 17, 2011.
Official Communication for European Patent Application No. 12186236.1 dated May 17, 2013.
Official Communication for European Patent Application No. 16160781.7 dated May 27, 2016.
Official Communication for European Patent Application No. 16184373.5 dated Jan. 17, 2017.
Official Communication for European Patent Application No. 16186622.3 dated Jan. 18, 2017.
Official Communication for Great Britain Patent Application No. 1319225.7 dated May 2, 2014.
Official Communication for Great Britain Patent Application No. 1620827.4 dated Jun. 28, 2017.
Official Communication for Great Britain Patent Application No. 1620827.4 dated Jan. 12, 2017.
Official Communication for New Zealand Patent Application No. 616167 dated Oct. 10, 2013.
Official Communication for U.S. Appl. No. 12/840,673 dated Jul. 25, 2012.
Official Communication for U.S. Appl. No. 12/840,673 dated Jan. 4, 2013.
Official Communication for U.S. Appl. No. 14/225,084 dated Feb. 20, 2015.
Official Communication for U.S. Appl. No. 14/289,596 dated Aug. 5, 2015.
Official Communication for U.S. Appl. No. 14/323,878 dated Jul. 27, 2017.
Official Communication for U.S. Appl. No. 14/323,878 dated Mar. 30, 2017.
Official Communication for U.S. Appl. No. 14/323,881 dated Apr. 18, 2017.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/571,098 dated Feb. 23, 2016.

\* cited by examiner

| Number | Consuming Entity ID (e.g., name or code) | Consuming Entity Location | | | | Provisioning Entity ID (e.g., name or code) | Provisioning Entity Location | | | | Type of Provisioning Entity (e.g., name or code) | Interaction Amount (e.g., in Dollars) | Time of Interaction | |
|---|---|---|---|---|---|---|---|---|---|---|---|---|---|---|
| | | State | City | Zip Code | Street Address | | State | City | Zip Code | Street Address | | | Date | Time |
| 1 | User 1 | California | Palo Alto | 94304 | 123 Main St | PE001 | California | Palo Alto | 94304 | 234 University Ave | Gas Station | 74.56 | 2013/11/23 | 10:32 |
| 2 | CE002 | California | Sunnyvale | 94085 | 123 Murphy St | Merchant 2 | Unknown | Unknown | Unknown | Unknown | Supermarket | 23.56 | 2013/10/15 | 11:23 |
| 3 | User 1 | California | Palo Alto | 94304 | 123 Main St | Merchant 2 | Unknown | Unknown | Unknown | Unknown | TPE123 | 32.11 | 2013/11/21 | 19:00 |
| 4 | User 3 | California | San Francisco | 94102 | 1000 Lombard St | Merchant 3 | California | San Francisco | 94102 | 123 Market St | Coffee Shop | 8.97 | 2013/10/20 | 17:05 |
| 5 | User 3 | Unknown | Unknown | Unknown | Unknown | Merchant 3 | California | San Francisco | 94102 | 123 Market St | Coffee Shop | 5.34 | 2013/11/03 | 8:03 |
| ... | | | | | | | | | | | | | | |
| 50,000,000,000 | User N | California | Beverly Hills | 90210 | 123 Wilshire Blvd | Merchant N | California | Beverly Hills | 90210 | 789 Wilshire Blvd | TPE789 | 89.23 | 2013/10/28 | 14:00 |

FIG. 4

METHODS AND SYSTEMS FOR DETERMINING LOCATION INFORMATION

BACKGROUND

The amount of information being processed and stored is rapidly increasing as technology advances present an ever-increasing ability to generate and store data. This data is commonly stored in computer-based systems in structured data stores. For example, one common type of data store is a so-called "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Numerous organizations, including industry, retail, and government entities, recognize that important information and decisions can be drawn if massive data sets can be analyzed to determine useful information. Collecting, classifying, and processing large sets of data can allow these entities to make more informed decisions. The manner in which these organizations collect and classify information, however, has become antiquated over time and do not take advantage of the higher processing speeds associated with the "Big Data" era. With advances in multi-tenant environments (e.g., the "cloud"), new techniques previously unthought-of are being designed to efficiently sift through billions of data points to draw new and useful information.

BRIEF DESCRIPTION OF THE DRAWINGS

Reference will now be made to the accompanying drawings, which illustrate exemplary embodiments of the present disclosure and in which:

FIG. 4 is a block diagram of an exemplary data structure accessed in the process of analyzing entity performance, consistent with the embodiments of the present disclosure.

DETAILED DESCRIPTION

Reference will now be made in detail to exemplary embodiments, the examples of which are illustrated in the accompanying drawings. Whenever possible, the same reference numbers will be used throughout the drawings to refer to the same or like parts.

Figure 1:
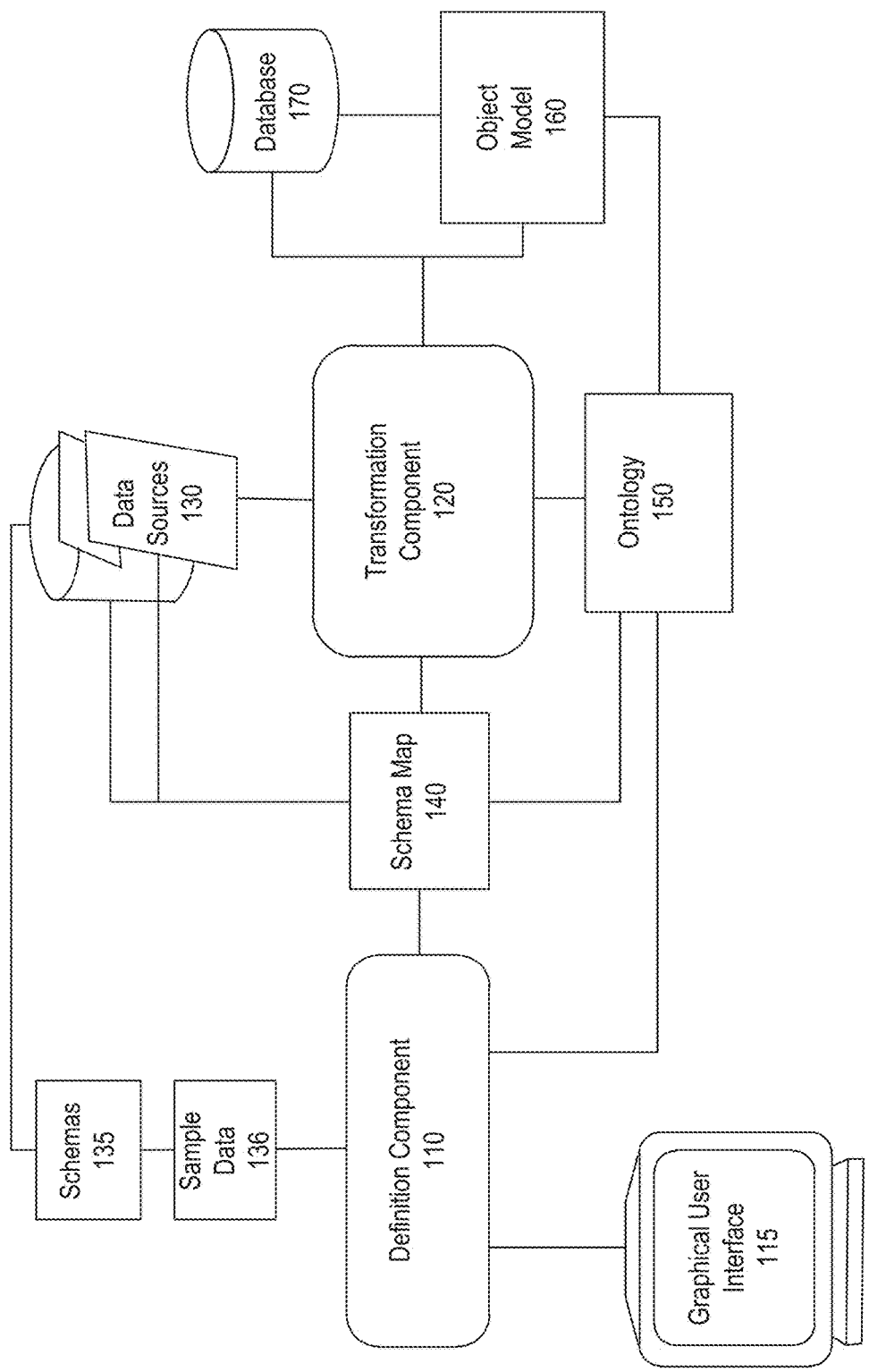
FIG. 1 illustrates, in block diagram form, an exemplary data fusion system for providing interactive data analysis, consistent with embodiments of the present disclosure.
Figure 2:
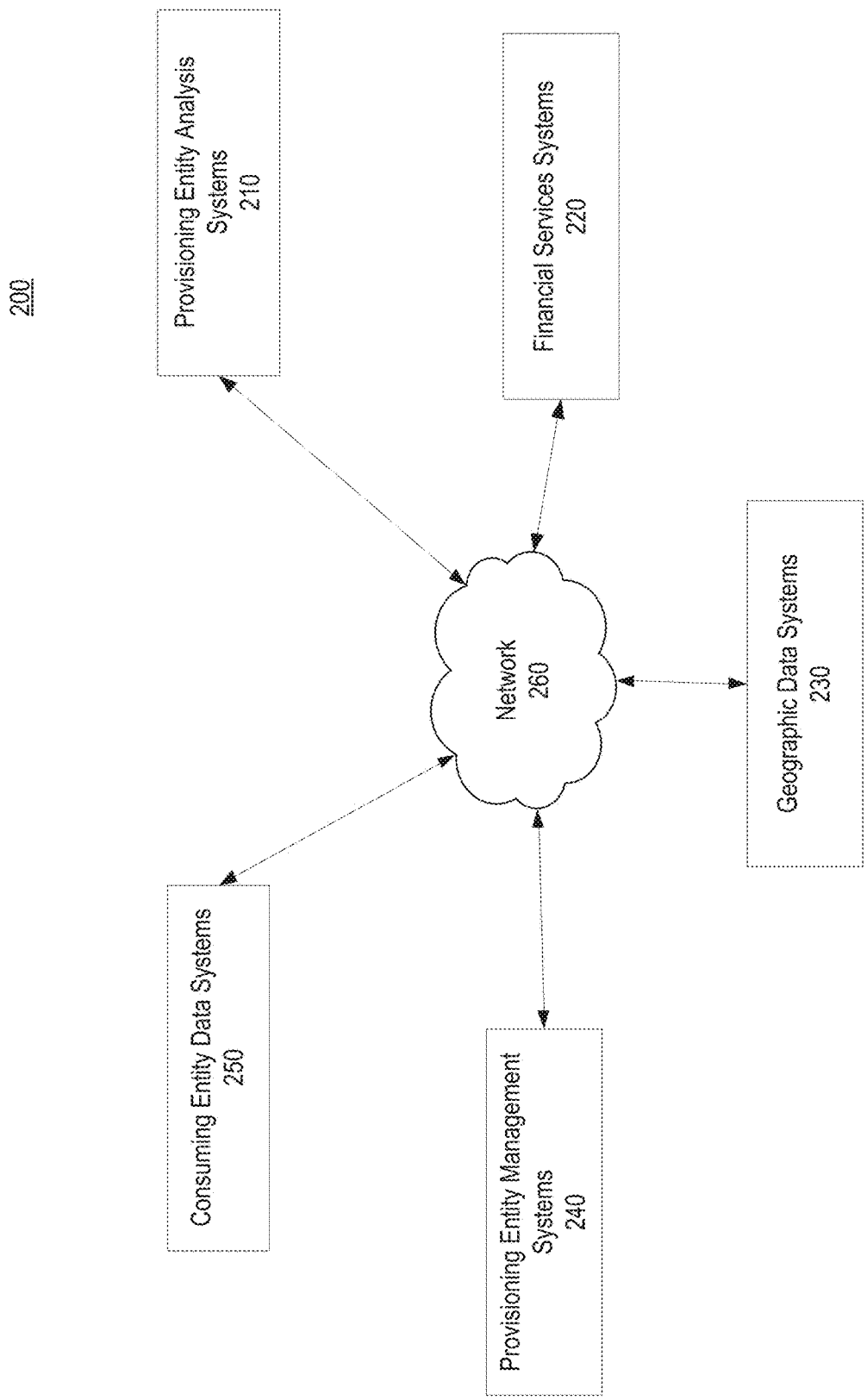
FIG. 2 is a block diagram of an exemplary system for analyzing performance of an entity, consistent with embodiments of the present disclosure.

FIG. 1 illustrates, in block diagram form, an exemplary data fusion system 100 for providing interactive data analysis, consistent with embodiments of the present disclosure. Among other things, data fusion system 100 facilitates transformation of one or more data sources, such as data sources 130 (e.g., financial services systems 220, geographic data systems 230, provisioning entity management systems 240 and/or consuming entity data systems 250, as shown in FIG. 2) into an object model 160 whose semantics are defined by an ontology 150. The transformation can be performed for a variety of reasons. For example, a database administrator can import data from data sources 130 into a database 170 for persistently storing object model 160. As another example, a data presentation component (not depicted) can transform input data from data sources 130 "on the fly" into object model 160. The object model 160 can then be utilized, in conjunction with ontology 150, for analysis through graphs and/or other data visualization techniques.

Data fusion system 100 comprises a definition component 110 and a translation component 120, both implemented by one or more processors of one or more computing devices or systems executing hardware and/or software-based logic for providing various functionality and features of the present disclosure, as described herein. As will be appreciated from the present disclosure, data fusion system 100 can comprise fewer or additional components that provide the various functionalities and features described herein. Moreover, the number and arrangement of the components of data fusion system 100 responsible for providing the various functionalities and features described herein can further vary from embodiment to embodiment.

Definition component 110 generates and/or modifies ontology 150 and a schema map 140. Exemplary embodiments for defining an ontology (such as ontology 150) are described in U.S. Pat. No. 7,962,495 (the '495 patent), issued on Jun. 14, 2011, the entire contents of which are expressly incorporated herein by reference for all purposes. Consistent with certain embodiments disclosed in the '495 patent, a dynamic ontology may be used to create a database. To create a database ontology, one or more object types may be defined, where each object type includes one or more properties. The attributes of object types or property types of the ontology can be edited or modified at any time. And, for each property type, at least one parser definition may be created. The attributes of a parser definition can be edited or modified at any time.

In some embodiments, each property type is declared to be representative of one or more object types. A property type is representative of an object type when the property type is intuitively associated with the object type. Alternatively, each property type has one or more components and a base type. In some embodiments, a property type can comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is an Address property having a City component and a State component. An example of raw input data is "Los Angeles, Calif." An example parser definition specifies an association of imported input data to object property components as follows: {CITY}, {STATE}→Address:State, Address:City. In some embodiments, the association {CITY}, {STATE} is defined in a parser definition using regular expression symbology. The association {CITY}, {STATE} indicates that a city string followed by a state string, and separated by a comma, comprises valid input data for a property of type Address. In contrast, input data of "Los Angeles Calif." would not be valid for the specified parser definition, but a user could create a second parser definition that does match input data of "Los Angeles Calif." The definition Address:City, Address:State specifies that matching input data values map to components named "City" and "State" of the Address property. As a result, parsing the input data using the parser definition results in assigning the value "Los Angeles" to the Address:City component of the Address property, and the value "CA" to the Address:State component of the Address property.

According to some embodiments, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130; for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Based on the identified information, definition component 110 can generate a graphical user interface 115, which may include a map. Graphical user interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical user interface 115 features a visual workspace that visually depicts representations of the elements of ontology 150 for which mappings are defined in schema map 140.

In some embodiments, transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include data structures stored persistently in non-volatile memory. Data sources 130 can also or alternatively include temporary data structures generated from underlying data sources via data extraction components, such as a result set returned from a database server executing a database query.

Schema map 140, ontology 150, and schemas 135 can be stored in any suitable structures, such as XML files, database tables, and so forth. In some embodiments, ontology 150 is maintained persistently. Schema map 140 can or cannot be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. Alternatively, the elements of object model 160 are stored within database 170 in a different underlying format, such as in a series of object, property, and relationship tables in a relational database.

According to some embodiments, the functionalities, techniques, and components described herein are implemented by one or more special-purpose computing devices. The special-purpose computing devices can be hard-wired to perform the techniques, or can include digital electronic devices such as one or more application-specific integrated circuits ("ASICs") or field programmable gate arrays ("FPGAs") that are persistently programmed to perform the techniques, or can include one or more hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, portable computer systems, handheld devices, networking devices, or any other device that incorporates hard-wired and/or program logic to implement the techniques.

Throughout this disclosure, reference will be made to an entity such as, for example, a provisioning entity and a consuming entity. It will be understood that a provisioning entity can include, for example, an advertiser, a person committing a crime, a merchant, an Internet Service Provider, a telecommunications company, a retail provisioning entity or the like, and a consuming entity can include, for example, a victim of a crime, a viewer of a website, a user sending messages, a consumer user buying products or services from a provisioning entity, etc. It will be understood that a consuming entity can represent either individual persons or can represent a group of persons (e.g., a group of persons living under one roof as part of a family). In some embodiments, a consuming entity can be a credit card number of an individual or a credit card number for an entire family sharing one credit card. It will also be understood that a provisioning entity can represent either the entity itself or individual persons involved with the entity.

In embodiments described herein, data fusion system 100 can provide a provisioning entity, such as a telecommunications company or retail provisioning entity, to analyze information to identify behaviors to allow that provisioning entity to make more informed decisions. Such information can allow entities, such as a retail provisioning entity, to determine a preferred location of a provisioning entity (e.g., where to place their retail locations). Similarly, a telecommunications company may know where to place advertisements. As another example, a police department may know where to station additional police units. Provisioning entities having more than one location (e.g., police stations, or a merchant with a chain store or a franchise model) typically evaluate the performance of their locations and may adjust their operations, business models, or work flows when the locations either under-perform or are under-utilized. Typically, provisioning entities evaluate the performance of their locations based on period-to-period metrics. For example, a provisioning entity can evaluate a website's performance by comparing a current month's user views to the user views of a previous month. Similarly, a provisioning entity can evaluate a location's performance by comparing the current month's sales to the previous month's sales. In addition, provisioning entitles can evaluate each of its locations' performance using comparative analysis. For example, a provisioning entity (e.g., a city's police department) might compare the amount and type of crimes occurring in a first location with an amount and type of crimes occurring in a second location. As another example, a provisioning entity (e.g., a restaurant) might compare the sales at an area location with the sales at a second location. As provisioning entities generally measure the performance of its locations based on their own interaction data (e.g., the entity's sales across some or all of its locations), some methods of measuring performance do not consider sales made by competitors or demographic features of the areas of the provisioning entity's locations.

In some embodiments, since some performance evaluation methods do not consider the sales of competitors or the demographic features of the region of the provisioning entity location, measured performance may not represent the true performance of a provisioning entity. For instance, although a provisioning entity in a particular demographic location, for example a location in a low consumer spend capacity area, might have less sales than a provisioning entity location in a high consumer spend capacity area, it may be performing better than what could be expected for that area in light of, for example, the low number of consumers residing in the area or the low income of the area. Similarly, a crime rate or type of crime might be higher or lower in a particular area. Moreover, website views can be higher or lower in a given area for a variety of reasons. In some embodiments, a performance of a provisioning entity at an area location can be adversely impacted by the close proximity of a second location of the provisioning entity, but the provisioning entity at the area location can be performing better than expected given the competition from the provisioning entity's second location. Conversely, while a provisioning entity location in a dense, high-income area might have the highest sales of all provisioning entity locations, it can still be under-performing because, for instance, consumer spend capacity is high and the provisioning entity location could generate more sales.

Consistent with embodiments of the present disclosure, the performance of provisioning entities can be analyzed based on how the provisioning entity is expected to perform given the location of the provisioning entity. For a given provisioning entity location, the disclosed embodiments may be implemented to consider, for example, consumer demographic features of the provisioning entity location's area and/or the proximity of competitors to the provisioning entity location (including the proximity of the provisioning entity's other close-by locations). In some embodiments, the provisioning entity can be a merchant. For purposes of illustration, exemplary embodiments for analyzing entity performance may be described herein with reference to "merchants." The exemplary embodiments and techniques described herein, however, may be applied to other types of entities (e.g., service providers, governmental agencies, etc.) within the spirit and scope of this disclosure.

Generally, embodiments of the invention relate to determining information associated with interactions. In some embodiments, the information determined based on various interactions can be used to generate additional information that can be displayed with user interfaces that can include maps and/or information overlaying maps. Types of interactions from which information overlaying a map can be derived include, e.g., telephone calls made or received, messages sent or received, viewing an advertisement, viewing a video, accessing a website, making a purchase at a brick-and-mortar store, making a purchase online, shipping or receiving an object, the occurrence of a crime, the arrival of a vehicle, the starting of an engine, etc. Large sets of interaction data (e.g., data associated with interactions) may be filtered according to selectable criteria to provide, for example, information associated with interactions including a particular entity (e.g., a provisioning entity such an advertiser or merchant, or a consuming entity such as a customer). Such selectable criteria can include an amount times that calls messages were sent, addresses of entities that messages were sent to, time spent on a website, a type of crime committed, demographic information about an area where a crime was committed, amounts spent at a particular location, times of purchases, time spent between purchases, types of merchants associated with purchase, demographics associated with a purchaser, purchaser identity, a type of vehicle involved in an interaction, demographics associated with a location of a merchant, types of devices located at or near the location where an interaction occurred, Merchant Category Codes ("MCCs"), types of products purchased, etc. In addition, interaction data, or selectable criteria based on interaction data, may be expressed on a map.

In some embodiments, interaction data is acquired from one or more sources such as a government agency, a news source, financial institution, a provisioning entity, a third-party processer, a card network, a review website, etc. Each interaction can include a consuming entity and a provisioning entity. After interaction data is acquired, a consuming entity associated with the interaction data can be determined. After a consuming entity is determined, a set of provisioning entities can be determined that were included in interactions with the consuming entity. For example, the set of provisioning entities may include all of the provisioning entities that the consuming entity made a phone call to or a purchase at during the last sixty days. After a set of provisioning entities is determined, interaction data can be displayed on a map that indicates the location of at least some of the provisioning entities in the set of provisioning entities. In some examples, interaction data associated with more than one consuming entity can be determined (e.g., interactions made by a set of consuming entities over the past 60 days can be determined).

In some examples, interaction data expressed on a map can include the locations of the set of provisioning entities within a particular distance from a particular location. For example, the interaction data expressed on a map can include the locations of stores or crimes within a particular city. In some examples, interaction data expressed on a map can include the set of provisioning entities where interactions occurred within the last week, over the last weekend, on the previous five Friday nights, etc. In some embodiments, interaction data expressed on a map can include a set of provisioning entities associated with a particular ratio (e.g., crimes to police units, amounts spent to amounts received, number of consuming entities to amounts spent, number of consuming entities to number of websites viewed, etc.). Selectable criteria, as discussed above, can also be used to express interaction data on a map. For instance, criteria associated with interaction data such as the location of a crime, a consuming entity's home, or a consuming entity's place of employment can be expressed on a map.

Interaction data expressed on a map can indicate the locations of provisioning entities, consuming entities, and other information in a variety of ways. For example, interaction data expressed on a map can indicate locations (or other information associated with the interaction data) using geometric shapes that can overlay a map. A geometric shape such as a hexagon or circle can be used to indicate the location of a provisioning entity, an amount of provisioning entities within a particular area, an aggregate number of crimes, types of crimes, an amount of webpages accessed by a particular type of phone and/or a particular telecommunications company, an aggregate amount of sales (e.g., an amount of money spent) within a particular area, a number of advertisements in a particular area, a number of employees at a particular location, an average amount of income paid by stores at a particular location, an amount of consuming entities within a particular area, the demographics (e.g., an average amount of household income or spending capacity) associated with consuming entities in a particular area, etc. Such shapes can be placed at a location on a map based on a geo-hash.

In addition, interaction data expressed on a map can be used to indicate the preferred location of a new police station, a new cellular phone tower, marketing material or the preferred location of a provisioning entity. For example, an indication for a preferred location of a new police station can be displayed on a map based on interaction data that includes crimes. Similarly, an indication of a preferred location of marketing material (e.g., an estimated most effective place to display marketing material) can be displayed on a map based on interaction data that includes where consuming entities live and conduct interactions. Similarly, an indication of a preferred location of a provisioning entity (e.g., a location (estimated or otherwise) where a new provisioning entity such as communications equipment should be placed) can be displayed on a map based on interaction data.

In various embodiments described herein, a preferred location of marketing material, a preferred location of a provisioning entity, etc., can be determined based on interaction data used to create geometric shapes. For example, data that causes circles to appear on a map and overlap can also be used to determine a preferred location of a provisioning entity (e.g., the area where the circles overlap). Embodiments described herein reduce processing power, and network throughput by efficiently processing data in various manners such as by associating shapes with data. Further, they allow a user to view additional information on a user interface, thereby saving display real estate, without needing to switch between a plurality of programs, for example.

FIG. 2 is a block diagram of an exemplary system 200 for performing one or more operations for analyzing performance of a provisioning entity and/or a consuming entity, consistent with disclosed embodiments. In some embodiments, the provisioning entity is a merchant and system 200 can include provisioning entity analysis system 210, one or more financial services systems 220, one or more geographic data systems 230, one or more provisioning entity management systems 240, and one or more consuming entity data systems 250. The components and arrangement of the components included in system 200 can vary depending on the embodiment. For example, a component used by police or other government agencies may be included. Further, for example, the functionality described below with respect to financial services systems 220 can be embodied in consuming entity data systems 250, or vice-versa. Thus, system 200 can include fewer or additional components that perform or assist in the performance of one or more processes to analyze provisioning entity's, consistent with the disclosed embodiments.

One or more components of system 200 can be computing systems configured to analyze provisioning entity performance. As further described herein, components of system 200 can include one or more computing devices (e.g., computer(s), server(s), etc.), memory storing data and/or software instructions (e.g., database(s), memory devices, etc.), and other appropriate computing components. In some embodiments, the one or more computing devices are configured to execute software or a set of programmable instructions stored on one or more memory devices to perform one or more operations, consistent with the disclosed embodiments. Components of system 200 can be configured to communicate with one or more other components of system 200, including provisioning entity analysis system 210, one or more financial services systems 220, one or more geographic data systems 230, one or more provisioning entity management systems 240, and one or more consumer data systems 250. In certain aspects, users can operate one or more components of system 200. The one or more users can be employees of, or associated with, the entity corresponding to the respective component(s) (e.g., someone authorized to use the underlying computing systems or otherwise act on behalf of the entity).

Figure 3:
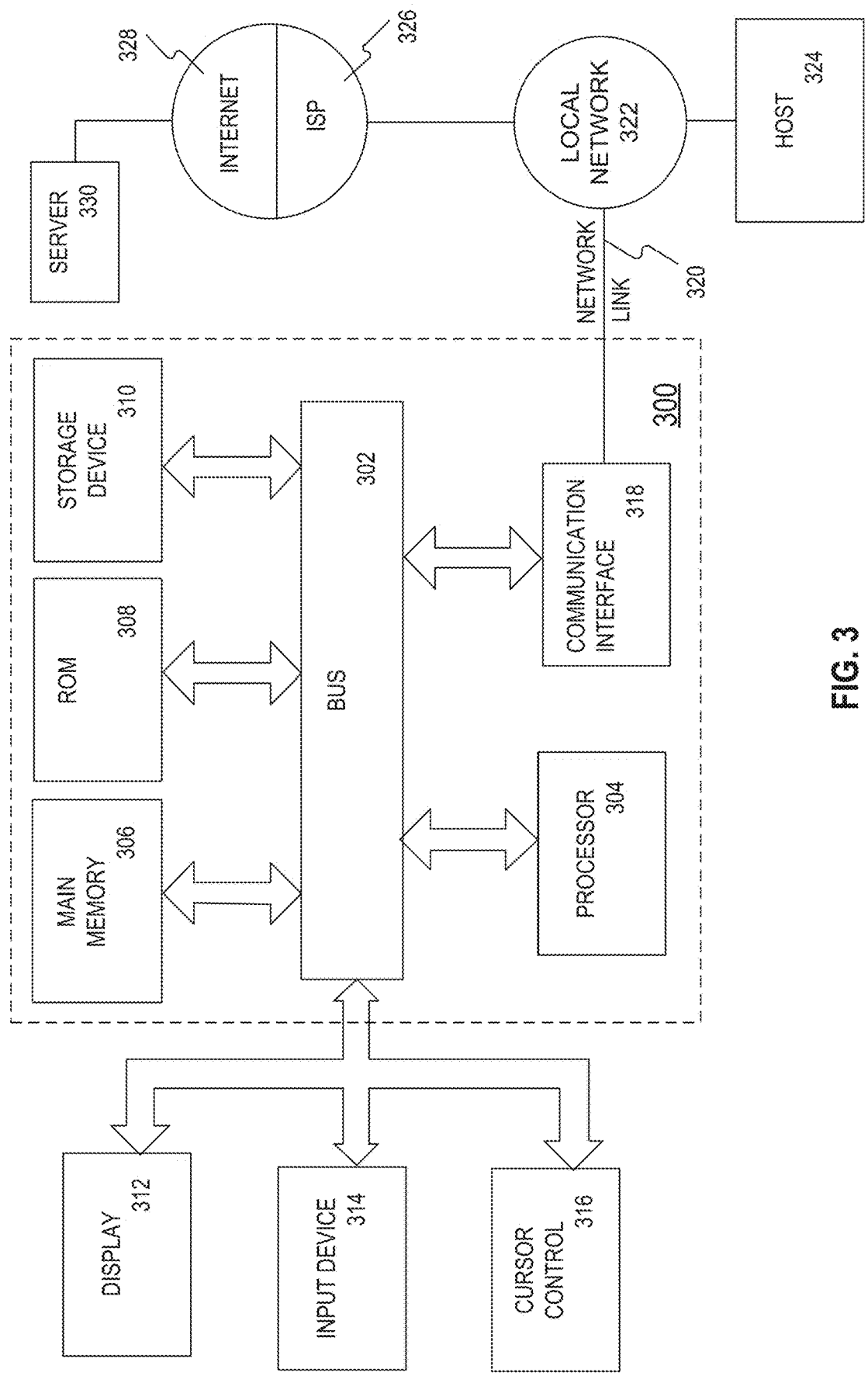
FIG. 3 is a block diagram of an exemplary computer system, consistent with embodiments of the present disclosure.

Provisioning entity analysis system 210 can be a computing system configured to analyze provisioning entity performance. For example, provisioning entity analysis system 210 can be a computer system configured to execute software or a set of programmable instructions that collect or receive interaction data (which can include financial interaction data, consumer data, and provisioning entity data) and process it to determine the actual interaction amount of each interaction associated with the provisioning entity. Provisioning entity analysis system 210 can be configured, in some embodiments, to utilize, include, or be a data fusion system 100 (see, e.g., FIG. 1) to transform data from various data sources (such as, financial services systems 220, geographic data systems 230, provisioning entity management systems 240, and consuming entity data systems 250) for processing. In some embodiments, provisioning entity analysis system 210 can be implemented using a computer system 300, as shown in FIG. 3 and described below.

Provisioning entity analysis system 210 can include one or more computing devices (e.g., server(s)), memory storing data and/or software instructions (e.g., database(s), memory devices, etc.) and other known computing components. According to some embodiments, provisioning entity analysis system 210 can include one or more networked computers that execute processing in parallel or use a distributed computing architecture. Provisioning entity analysis system 210 can be configured to communicate with one or more components of system 200, and it can be configured to provide analysis of provisioning entities via an interface(s) accessible by users over a network (e.g., the Internet). For example, provisioning entity analysis system 210 can include a web server that hosts a web page accessible through network 260 by provisioning entity management systems 240. In some embodiments, provisioning entity analysis system 210 can include an application server configured to provide data to one or more client applications executing on computing systems connected to provisioning entity analysis system 210 via network 260. Such client applications can be used to generate and/or display a map.

In some embodiments, provisioning entity analysis system 210 can be configured to determine the a number of crimes or the sales associated with a provisioning entity or specific provisioning entity location by processing and analyzing data collected from one or more components of system 200. For example, provisioning entity analysis system 210 can determine that the Big Box Merchant store located at 123 Main St, in Burbank, Calif. is actually generating $60,000 of sales per month. Provisioning entity analysis system 210 can provide an analysis of a provisioning entity or provisioning entity location's performance based on a target for sales and the actual sales for the provisioning entity or provisioning entity location. For example, for the Big Box Merchant store located at 123 Main St., Burbank, Calif., the provisioning entity analysis system 210 can provide an analysis that the store is performing above expectations.

Provisioning entity analysis system 210 can, in some embodiments, generate a user interface communicating data related to one or more provisioning entities or provisioning entity locations. For example, in some embodiments, provisioning entity analysis system 210 includes a web server that generates HTML code, or scripts capable of generating HTML code, that can be displayed in a web browser executing on computing device. Provisioning entity analysis system 210 can also execute an application server that provides user interface objects to a client application executing on a computing device, or it can provide data that is capable of being displayed in a user interface in a client application executing on a computing device. In some embodiments, provisioning entity analysis system 210 can generate user interfaces that can be displayed within another user interface. For example, provisioning entity analysis system 210 can generate a user interface for display within a parent user interface that is part of an application that displays maps, a word processing application, a presentation development application, a web browser, or an illustration application, among others. In some embodiments, generating a user interface can include generating the code that when executed displays information (e.g., HTML) on the user interface. Alternatively, generating a user interface can include providing commands and/or data to a set of instructions that when executed render a user interface capable of being shown on a display connected to a computing device. In some embodiments, the user interface can include a map, indications of the provisioning entity locations on a map, and indications of the sales or interactions associated with the provisioning entity locations.

Referring again to FIG. 2, financial services system 220 can be a computing system associated with a financial service provider, such as a bank, credit card issuer, credit bureau, credit agency, or other entity that generates, provides, manages, and/or maintains financial service accounts for one or more users. It should be appreciated that these entities can also include data sources that provide interaction data. Financial services system 220 can generate, maintain, store, provide, and/or process financial data associated with one or more financial service accounts. Financial data can include, for example, financial service account data, such as financial service account identification data, account balance, available credit, existing fees, reward points, user profile information, and financial service account interaction data, such as interaction dates, interaction amounts, interaction types, and locations of interactions. Note that the term interaction may be used interchangeably with the term transaction herein. In some embodiments, each interaction including financial data can include several categories of information associated with an interaction. For example, each interaction can include categories such as number category; consuming entity identification category; consuming entity location category; provisioning entity identification category; provisioning entity location category; type of provisioning entity category; interaction amount category; and time of interaction category, as described in FIG. 4. It will be appreciated that financial data can comprise either additional or fewer categories than the exemplary categories listed above. Financial services system 220 can include infrastructure and components that are configured to generate and/or provide financial service accounts such as credit card accounts, checking accounts, savings account, debit card accounts, loyalty or reward programs, lines of credit, and the like.

Geographic data systems 230 can include one or more computing devices configured to provide geographic data to other computing systems in system 200 such as provisioning entity analysis system 210. For example, geographic data systems 230 can provide geodetic coordinates when provided with a street address of vice-versa. In some embodiments, geographic data systems 230 exposes an application programming interface ("API") including one or more methods or functions that can be called remotely over a network, such as network 260. According to some embodiments, geographic data systems 230 can provide information concerning routes between two geographic points. For example, provisioning entity analysis system 210 can provide two addresses and geographic data systems 230 can provide, in response, the aerial distance between the two addresses, the distance between the two addresses using roads, and/or a suggested route between the two addresses and the route's distance.

Figure 5:
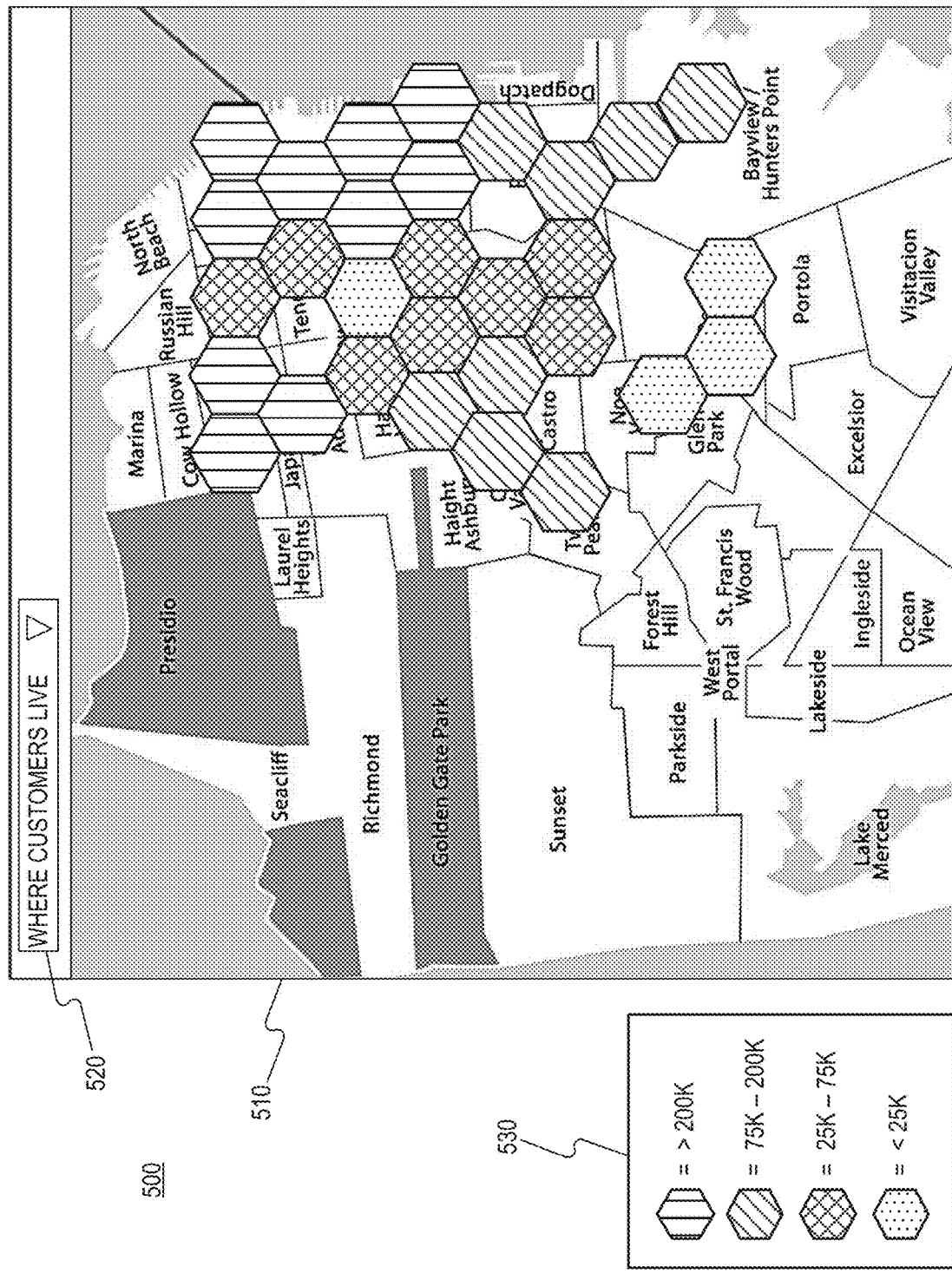
FIG. 5 is a diagram of an exemplary user interface displaying a map that indicates where consuming entities live, consistent with the embodiments of the present disclosure.
Figure 6:
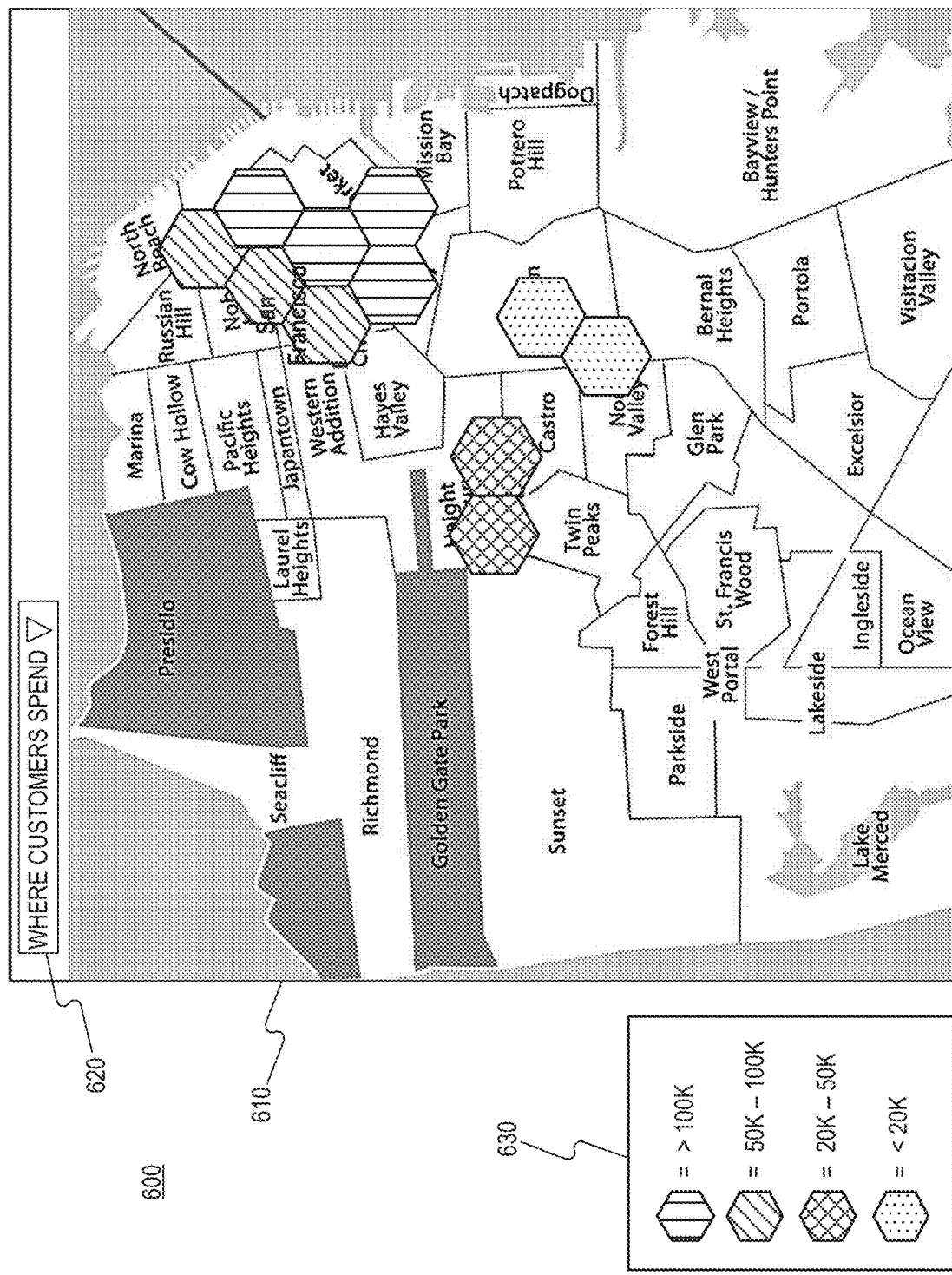
FIG. 6 is a diagram of an exemplary user interface displaying a map that indicates where consuming entities spend, consistent with the embodiments of the present disclosure.
Figure 7:
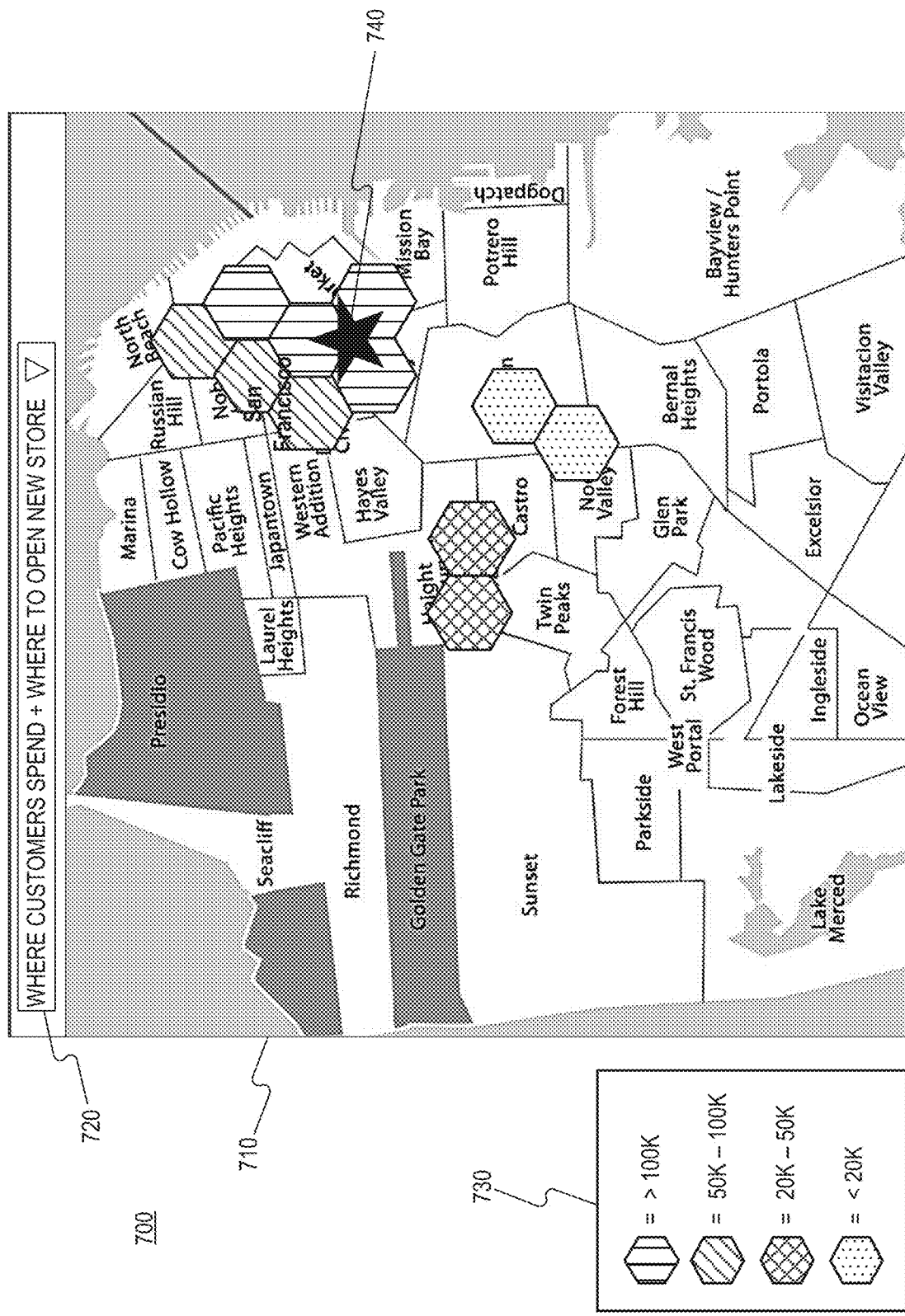
FIG. 7 is a diagram of an exemplary user interface displaying a map indicating a preferred location of a provisioning entity, consistent with the embodiments of the present disclosure.
Figure 8:
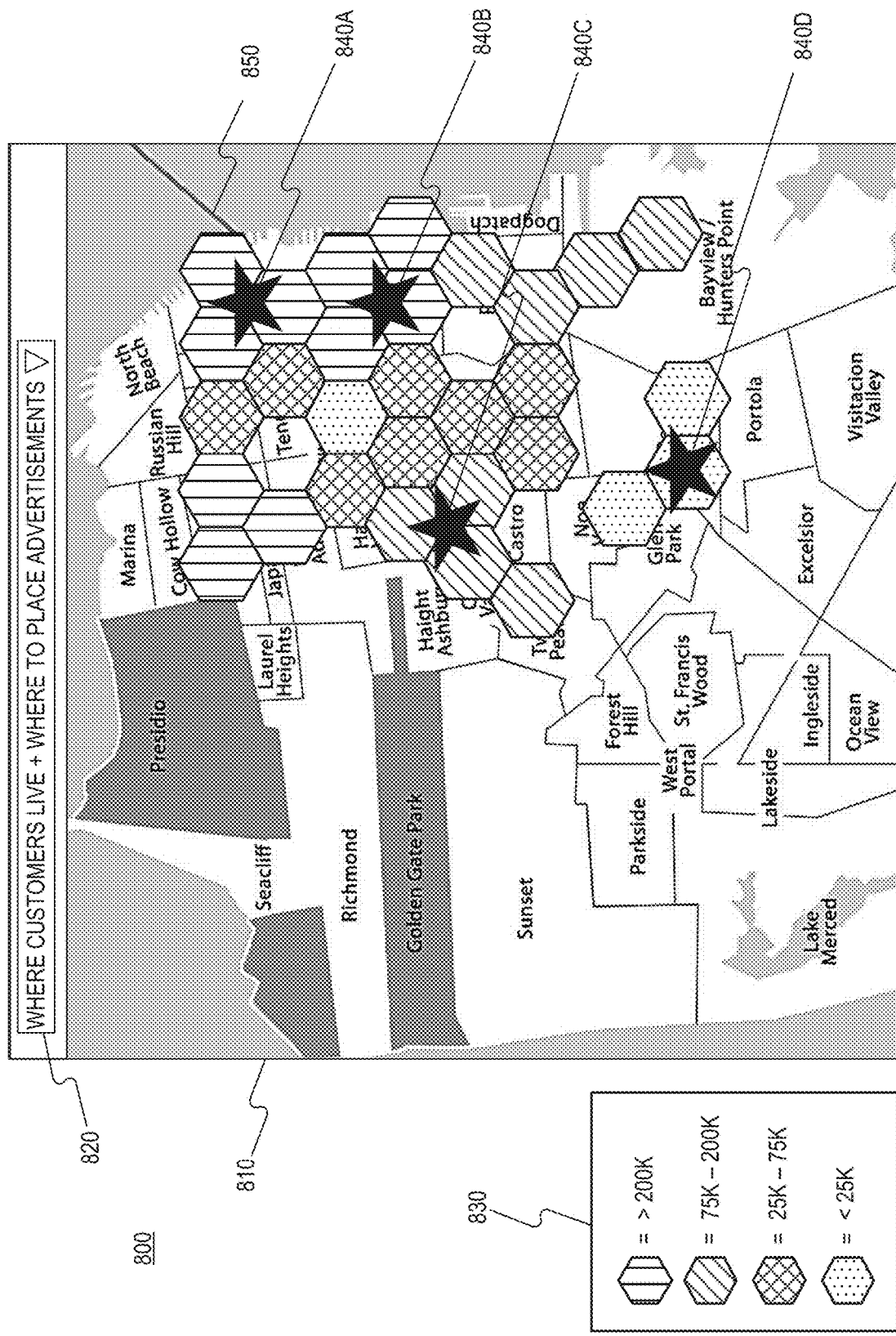
FIG. 8 is a diagram of an exemplary user interface displaying a map indicating a preferred location of marketing material, consistent with the embodiments of the present disclosure.

According to some embodiments, geographic data systems 230 can also provide map data to provisioning entity analysis system 210 and/or other components of system 200 (such as user interface 500 of FIG. 5, user interface 600 of FIG. 6, user interface 700 of FIG. 7, or user interface 800 of FIG. 8). The map data can include, for example, satellite or overhead images of a geographic region or a graphic representing a geographic region. The map data can also include points of interest, such as landmarks, malls, shopping centers, schools, or popular restaurants or retailers, for example.

Provisioning entity management systems 240 can be one or more computing devices configured to perform one or more operations consistent with disclosed embodiments. For example, provisioning entity management systems 240 can be a desktop computer, a laptop, a server, a mobile device (e.g., tablet, smart phone, etc.), or any other type of computing device configured to request provisioning entity analysis from provisioning entity analysis system 210. According to some embodiments, provisioning entity management systems 240 can comprise a network-enabled computing device operably connected to one or more other presentation devices, which can themselves constitute a computing system. For example, provisioning entity management systems 240 can be connected to a mobile device, telephone, laptop, tablet, or other computing device.

Provisioning entity management systems 240 can include one or more processors configured to execute software instructions stored in memory. Provisioning entity management systems 240 can include software or a set of programmable instructions that when executed by a processor performs known Internet-related communication and content presentation processes. For example, provisioning entity management systems 240 can execute software or a set of instructions that generates and displays interfaces and/or content on a presentation device included in, or connected to, provisioning entity management systems 240. In some embodiments, provisioning entity management systems 240 can be a mobile device that executes mobile device applications and/or mobile device communication software that allows provisioning entity management systems 240 to communicate with components of system 200 over network 260. The disclosed embodiments are not limited to any particular configuration of provisioning entity management systems 240.

Provisioning entity management systems 240 can be one or more computing systems associated with a provisioning entity that provides services (e.g., a law firm, a police station, a banker, a school, utility company, insurance company, financial service provider, automobile repair services, movie theater, etc.). In some embodiments, provisioning entity management systems 240 can be one or more computing systems associated with a provisioning entity that provides products (e.g., goods and/or services), such as a restaurant (e.g., Outback Steakhouse®, Burger King®, etc.), retailer (e.g., Amazon.com®, Target®, etc.), grocery store, mall, or a shopping center. Further, in some embodiments a provisioning entity can be one or more computing systems associated with a non-profit organization (ACLU™, AARP®, etc.) or any other type of entity that provides goods, services, and/or information that consuming entities (i.e., end-users or other business entities) can purchase, consume, use, etc. For ease of discussion, the exemplary embodiments presented herein relate to interactions (e.g., purchases) involving goods from retail provisioning entity systems. Provisioning entity management systems 240, however, is not limited to systems associated with retail provisioning entities that conduct business in any particular industry or field.

Provisioning entity management systems 240 can be associated with computer systems installed and used at a brick and mortar provisioning entity locations where a consumer can physically visit and purchase goods and services. Such locations can include computing devices that perform financial service interactions with consumers (e.g., Point of Sale ("POS") terminal(s), kiosks, tablet computers, mobile phones, etc.). Provisioning entity management systems 240 can also include back- and/or front-end computing components that store data and execute software or a set of instructions to perform operations consistent with disclosed embodiments, such as computers that are operated by employees of the provisioning entity (e.g., back office systems, etc.). Provisioning entity management systems 240 can also be associated with a provisioning entity that provides goods and/or service via known online or e-commerce types of solutions. For example, such a provisioning entity can sell products via a website using known online or e-commerce systems and solutions to market, sell, and process online interactions. Provisioning entity management systems 240 can include one or more servers that are configured to execute stored software or a set of instructions to perform operations associated with a provisioning entity, including one or more processes associated with processing purchase interactions, generating interaction data, generating product data (e.g., SKU data) relating to interactions, for example.

Consuming entity data systems 250 can include one or more computing devices configured to provide demographic data regarding consumers. For example, consuming entity data systems 250 can provide information regarding the name, address, gender, income level, age, email address, or other information about consumers. Consuming entity data (as well as any interaction data) may be converted using a hash. Consuming entity data systems 250 can include public computing systems such as computing systems affiliated with the U.S. Bureau of the Census, the U.S. Bureau of Labor Statistics, or FedStats, or it can include private computing systems such as computing systems affiliated with financial institutions, credit bureaus, social media sites, marketing services, or some other organization that collects and/or provides demographic data.

Network 260 can be any type of network or combination of networks configured to provide electronic communications between components of system 200. For example, network 260 can be any type of network (including infrastructure) that provides communications, exchanges information, and/or facilitates the exchange of information, such as the Internet, a Local Area Network, or other suitable connection(s) that enables the sending and receiving of information between the components of system 200. Network 260 may also comprise any combination of wired and wireless networks. In other embodiments, one or more components of system 200 can communicate directly through a dedicated communication link(s), such as links between provisioning entity analysis system 210, financial services system 220, geographic data systems 230, provisioning entity management systems 240, and consuming entity data systems 250.

As noted above, provisioning entity analysis system 210 can include a data fusion system (e.g., data fusion system 100) for organizing data received from one or more of the components of system 200.

FIG. 3 is a block diagram of an exemplary computer system 300, consistent with embodiments of the present disclosure. The components of system 200 such as provisioning entity analysis system 210, financial service systems 220, geographic data systems 230, provisioning entity management systems 240, and consuming entity data systems 250 may include the architecture based on or similar to that of computer system 300.

As illustrated in FIG. 3, computer system 300 includes a bus 302 or other communication mechanism for communicating information, and one or more hardware processors 304 (denoted as processor 304 for purposes of simplicity) coupled with bus 302 for processing information. Hardware processor 304 can be, for example, one or more microprocessors or it can be a reduced instruction set of one or more microprocessors.

Computer system 300 also includes a main memory 306, such as a random access memory ("RAM") or other dynamic storage device, coupled to bus 302 for storing information and instructions to be executed by processor 304. Main memory 306 also can be used for storing temporary variables or other intermediate information during execution of instructions to be executed by processor 304. Such instructions, after being stored in non-transitory storage media accessible to processor 304, render computer system 300 into a special-purpose machine that is customized to perform the operations specified in the instructions.

Computer system 300 further includes a read only memory ("ROM") 308 or other static storage device coupled to bus 302 for storing static information and instructions for processor 304. A storage device 310, such as a magnetic disk, optical disk, or USB thumb drive (Flash drive), etc. is provided and coupled to bus 302 for storing information and instructions.

Computer system 300 can be coupled via bus 302 to a display 312, such as a cathode ray tube ("CRT"), liquid crystal display, or touch screen, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 300 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 300 can implement the techniques described herein using customized hard-wired logic, one or more ASICs or FPGAs, firmware and/or program logic which in combination with the computer system causes or programs computer system 300 to be a special-purpose machine. According to some embodiments, the operations, functionalities, and techniques and other features described herein are performed by computer system 300 in response to processor 304 executing one or more sequences of one or more instructions contained in main memory 306. Such instructions can be read into main memory 306 from another storage medium, such as storage device 310. Execution of the sequences of instructions contained in main memory 306 causes processor 304 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 310. Volatile media can include dynamic memory, such as main memory 306. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or other forms of flash memory, NVRAM, a register memory, a processor cache, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 302. Transmission media can also take the form of acoustic or light waves, such as those generated during radio-wave and infra-red data communications.

Various forms of media can be involved in carrying one or more sequences of one or more instructions to processor 304 for execution. For example, the instructions can initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 can optionally be stored on storage device 310 either before or after execution by processor 304.

Computer system 300 can also include a communication interface 318 coupled to bus 302. Communication interface 318 can provide a two-way data communication coupling to a network link 320 that can be connected to a local network 322. For example, communication interface 318 can be an integrated services digital network ("ISDN") card, cable modem, satellite modem, or a modem to provide a data communication connection to a corresponding type of telephone line. As another example, communication interface 318 can be a local area network ("LAN") card to provide a data communication connection to a compatible LAN. Wireless links can also be implemented. In any such implementation, communication interface 318 can send and receives electrical, electromagnetic or optical signals that carry digital data streams representing various types of information.

Network link 320 can typically provide data communication through one or more networks to other data devices. For example, network link 320 can provide a connection through local network 322 to a host computer 324 or to data equipment operated by an Internet Service Provider ("ISP") 326. ISP 326 in turn can provide data communication services through the world wide packet data communication network now commonly referred to as the "Internet" 328. Local network 322 and Internet 328 can both use electrical, electromagnetic or optical signals that carry digital data streams. The signals through the various networks and the signals on network link 320 and through communication interface 318, which carry the digital data to and from computer system 300, can be example forms of transmission media.

Computer system 300 can send messages and receive data, including program code, through the network(s), network link 320 and communication interface 318. In the Internet example, a server 330 can transmit a requested code for an application program through Internet 328, ISP 326, local network 322 and communication interface 318. The received code can be executed by processor 304 as it is received, and/or stored in storage device 310, or other non-volatile storage for later execution. In some embodiments, server 330 can provide information for being displayed on a display.

FIG. 4 is a block diagram of an exemplary data structure 400, consistent with embodiments of the present disclosure. Data structure 400 can store data records associated with interactions (also referred to as transactions) involving multiple entities. Data structure 400 can be, for example, a database (e.g., database 170) that can store elements of an object model (e.g., object model 160). In some embodiments, data structure 400 can be a Relational Database Management System ("RDBMS") that stores interaction data as sections of rows of data in relational tables. An RDBMS can be designed to efficiently return data for an entire row, or record, in as few operations as possible. An RDBMS can store data by serializing each row of data of data structure 400. For example, in an RDBMS, data associated with interaction 1 of FIG. 4 can be stored serially such that data associated with all categories of interaction 1 can be accessed in one operation.

Alternatively, data structure 400 can be a column-oriented database management system that stores data as sections of columns of data rather than rows of data. This column-oriented DBMS can have advantages, for example, for data warehouses, customer relationship management systems, and library card catalogs, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of data structure 400. For example, in a column-oriented DBMS, data associated with a category (e.g., consuming entity identification category 420) can be stored serially such that data associated with that category for all interactions of data structure 400 can be accessed in one operation.

As shown in FIG. 4, data structure 400 can comprise data associated with a very large number of interactions associated with multiple entities. For example, data structure 400 can include 50 billion or more interactions. Prior to technological advances associated with network speeds, processing power, and memory, prior art systems did not envision the ability to perform processes associated with such a high volume of interactions. Solutions described herein are much more efficient. Solutions herein can determine meaningful information in a much more streamlined manner than prior art solutions.

In some embodiments, interactions associated with multiple entities can be referred to as interactions between multiple entities. Where appropriate, the terms interactions and transactions are intended to convey the same meaning and can be used interchangeably throughout this disclosure. While each interaction of data structure 400 is depicted as a separate row in FIG. 4, it will be understood that each such interactions can be represented by a column or any other known technique in the art. Interaction data can include several categories of information. For example, the several categories can include, number category 410; consuming entity identification category 420; consuming entity location category 430; provisioning entity identification category 440; provisioning entity location category 450; type of provisioning entity category 460; interaction amount category 470; and time of interaction category 480. It will be understood that FIG. 4 is merely exemplary and that data structure 400 can include even more categories of information associated with an interaction.

Number category 410 can uniquely identify each interaction of data structure 400. For example, data structure 400 depicts 50 billion interactions as illustrated by number category 410 of the last row of data structure 400 as 50,000,000,000. In FIG. 4, each row depicting a interactions can be identified by an element number. For example, interaction number 1 can be identified by element 401; interaction number 2 can be identified by element 402; and so on such that interaction 50,000,000,000 can be identified by 499B. It will be understood that this disclosure is not limited to any number of interactions and further that this disclosure can extend to a data structure with more or fewer than 50 billion interactions. It is also appreciated that number category 410 need not exist in data structure 400.

Consuming entity identification category 420 can identify a consuming entity. In some embodiments, consuming entity identification category 420 can represent a name (e.g., User 1 for interaction 401; User N for interaction 499B) of the consuming entity. Alternatively, consuming entity identification category 420 can represent a code uniquely identifying the consuming entity (e.g., CE002 for interaction 402). For example, the identifiers under the consuming entity identification category 420 can be a credit card number that can identify a person or a family, a social security number that can identify a person, a phone number or a MAC address associated with a cell phone of a user or family, or any other identifier.

Consuming entity location category 430 can represent location information of the consuming entity. In some embodiments, consuming entity location category 430 can represent the location information by providing at least one of: a state of residence (e.g., state sub-category 432; California for interaction 401; unknown for interaction 405) of the consuming entity; a city of residence (e.g., city sub-category 434; Palo Alto for interaction 401; unknown for interaction 405) of the consuming entity; a zip code of residence (e.g., zip code sub-category 436; 94304 for interaction 401; unknown for interaction 405) of the consuming entity; and a street address of residence (e.g., street address sub-category 438; 123 Main St. for interaction 401; unknown for interaction 405) of the consuming entity.

Provisioning entity identification category 440 can identify a provisioning entity (e.g., a merchant or a coffee shop). In some embodiments, provisioning entity identification category 440 can represent a name of the provisioning entity (e.g., Merchant 2 for interaction 402). Alternatively, provisioning entity identification category 440 can represent a code uniquely identifying the provisioning entity (e.g., PE001 for interaction 401). Provisioning entity location category 450 can represent location information of the provisioning entity. In some embodiments, provisioning entity location category 450 can represent the location information by providing at least one of: a state where the provisioning entity is located (e.g., state sub-category 452; California for interaction 401; unknown for interaction 402); a city where the provisioning entity is located (e.g., city sub-category 454; Palo Alto for interaction 401; unknown for interaction 402); a zip code where the provisioning entity is located (e.g., zip code sub-category 456; 94304 for interaction 401; unknown for interaction 402); and a street address where the provisioning entity is located (e.g., street address sub-category 458; 234 University Ave. for interaction 401; unknown for interaction 402).

Type of provisioning entity category 460 can identify a type of the provisioning entity involved in each interaction. In some embodiments, type of provisioning entity category 460 of the provisioning entity can be identified by a category name customarily used in the industry (e.g., Gas Station for interaction 401) or by an identification code that can identify a type of the provisioning entity (e.g., TPE123 for interaction 403). Alternatively, type of the provisioning entity category 460 can include a merchant category code ("MCC") used by credit card companies to identify any business that accepts one of their credit cards as a form of payment. For example, an MCC can be a four-digit number assigned to a business by credit card companies (e.g., American Express™, MasterCard™, VISA™) when the business first starts accepting one of their credit cards as a form of payment.

In some embodiments, type of provisioning entity category 460 can further include a sub-category (not shown in FIG. 4), for example, type of provisioning entity sub-category 461 that can further identify a particular sub-category of provisioning entity. For example, an interaction can comprise a type of provisioning entity category 460 as a hotel and type of provisioning entity sub-category 461 as either a bed and breakfast hotel or a transit hotel. It will be understood that the above-described examples for type of provisioning entity category 460 and type of provisioning entity sub-category 461 are non-limiting and that data structure 400 can include other kinds of such categories and sub-categories associated with an interaction.

Interaction amount category 470 can represent an amount (e.g., $74.56 for interaction 401) involved in each interaction. Time of interaction category 480 can represent a time at which the interaction was executed. In some embodiments, time of interaction category 480 can be represented by a date (e.g., date sub-category 482; Nov. 23, 2013, for interaction 401) and time of the day (e.g., time sub-category 484; 10:32 AM local time for interaction 401). Time sub-category 484 can be represented in either military time or some other format. Alternatively, time sub-category 484 can be represented with a local time zone of either provisioning entity location category 450 or consuming entity location category 430.

In some embodiments, interactions data can include categories of information including (not shown in FIG. 4), for example, consuming entity loyalty membership category, consuming entity credit card type category, consuming entity age category, consuming entity gender category, consuming entity income category, consuming entity with children category, product information category, and service information category.

Consuming entity loyalty membership category can represent whether the consuming entity is part of a loyalty membership program associated with a provisioning entity. For example, consuming entity loyalty membership category can represent that the consuming entity is a member of one of Costco™ membership programs including Goldstar Member™, Executive Member™, and Business Member™' Consuming entity credit card type category can represent the type of credit card used by the consuming entity for a particular interaction. For example, consuming entity credit card type category can indicate that the credit card used by the consuming entity for that particular interaction can be an American Express™, MasterCard™, VISA™, or Discover™ card. In some embodiments, consuming entity credit card type category can represent a kind of MasterCard™ (e.g., Gold MasterCard™ or Platinum MasterCard™) used for a particular interaction.

In some embodiments, consuming entity demographic information can be stored in each interaction. For example, consuming entity demographic information can include at least one of: consuming entity age category, consuming entity gender category, consuming entity income category, and consuming entity with children category. In some embodiments, consuming entity age category can represent age information associated with the consuming entity; consuming entity gender category can represent gender information (e.g., Male or Female) associated with the consuming entity; consuming entity income category can represent income information (e.g., greater than $100,000 per year) associated with the consuming entity; and consuming entity with children category can represent whether the consuming entity has any children under 18 or not. For example, if the consuming entity has children under 18, a positive indication can be stored and if the consuming entity does not have children under 18, a negative indication can be stored. In some embodiments, consuming entity with children category can store information representing a number of children associated with the consuming entity.

Product information category can represent information associated with a product that is involved in an interaction. For example, product information category can represent that the product involved in the interaction is a particular type of product based on a stock keeping unit ("SKU") of the product. In some embodiments, the product's SKU can be unique to a particular provisioning entity involved in that particular interaction. Alternatively, product information category can represent the product involved in the interaction with a at least one of a Universal Product Code, International Article Number, Global Trade Item Number, and Australian Product Number. Service information category can represent information associated with a service that is involved in an interaction. For example, service information category can represent that the service involved in the interaction is a particular type of service based on an SKU of the service. It will be appreciated that an SKU can uniquely represent either a product or a service. Some examples of services can be warranties, delivery fees, installation fees, and licenses.

FIG. 5 is a diagram of an exemplary user interface 500 displaying a map 510 that indicates where consuming entities live, consistent with the embodiments of the present disclosure. In this example, user interface 500 also comprises a widget 520 and a legend 530. As described herein, interaction data can be used to extract information used to generate user interface 500, which can include map 510 and data—some of which can be located on map 510. In various embodiments described herein, such data can be displayed as one or more geometric shapes, as will be described in more detail below.

In user interface 500, widget 520 allows a user to select an option that causes the user interface 500 to indicate where consuming entities live. Although not shown, a variety of other widgets can be present in user interface 500 to cause user interface 500 to display information associated with interaction data. For instance, widgets such as scroll bars, buttons, plus and minus signs, drop down menus, widgets to zoom in or out, and others can be used to cause user interface 500 (and/or legend 530) to display particular information. Some widgets can be used to determine the granularity with which systems described herein are able to show. For example, a user can select criteria that indicates demographics associated with consuming entities. In this example, legend 530 indicates that hexagons of different shading encompass areas where consuming entities that earn a particular average amount live. In this manner, map 510 appears similar to a heat map (e.g., a map that indicates data by having various shapes of various sizes and colors overlay the map). For instance, average consuming entities within dotted hexagons earn less than $25,000 per year; average consuming entities within criss-crossed hexagons earn between $25,000 and $75,000 per year; average consuming entities within hexagons with diagonal lines earn between $75,000 and $200,000 per year; and average consuming entities within hexagons with vertical lines earn over $200,000 per year.

It should be appreciated that the average earnings for consuming entities is only one example of the type of information displayed in user interface 500. Other examples can include, but are not limited to: an average number of people per household in a particular area; an average amount of income earned in a particular area; an average gender of people in a particular area; an average amount of time spent shopping online in a particular area; an average number of consuming entities with automobiles in a particular area; an average amount that consuming entities in a particular area spend on an average day, week, month, or other period of time; an average amount of growth in population of a particular area; an average number of children in a particular area; an average home price in a particular area; etc.

In some embodiments, numerous widgets 520 can exist that allow a user to modify the information shown in user interface 500. For instance, widgets 520 can allow a user to cause user interface 500 to show on map 510 areas with average consuming entities that make under $100,000 per year and have more than two children. Similarly, user interface 500 can display areas where average consuming entities make over $75,000 per year and spend over $50 on coffee in a given month. As another example, user interface 500 can display areas where average consuming entities spend less than $200 per month on groceries and over $100 on movie tickets on Friday nights in the past year. Multiple filters can be applied to data shown in a map to allow users to view information with a desired amount of granularity.

Interaction data can be used to derive the information discussed above and create a map 510 with the embodiments of the information discussed above overlaying map 510. For instance, interaction data can include the amount a consuming entity spends on groceries or gas. Such interaction data can be used to estimate, or identify, home and/or work locations of a consuming entity.

As briefly described above, various geometric shapes can be used to indicate information associated with interaction data. In some embodiments, shapes overlay all or portions of map 510 to display information. Shapes on a user interface can be transparent, opaque, or semi-transparent. While user interface 500 includes hexagons that contain different types of shading to indicate consuming entity income, any geometric shape can be used to indicate various types of information. For example, squares, circles, triangles, octagons, lines, dots, arrows, curved shapes, polygons, etc., can be used to indicate various types of information. In some embodiments, a different type of shape can be used to indicate a different type of information. For example, an area surrounded by a circle can indicate an average income level of consuming entities in the circled area, while an area surrounded by a square can indicate an average amount spent per month by consuming entities in the squared area. Similarly, areas surrounded by triangles can indicate an average number of children in consuming entities' households, while areas surrounded by non-rectangular polygons can indicate an average amount of money spent at grocery stores by consuming entities.

Similarly, the shading or color associated with a shape can be indicative of various types of information—which again, can be derived from interaction data. In the example shown in FIG. 5, dotted hexagons indicate areas with consuming entities that make less than $25,000 per year; criss-crossed hexagons indicate areas with consuming entities that make between $25,000 and $75,000 per year; hexagons with diagonal lines indicate areas with consuming entities that make between $75,000 per year and $200,000 per year; and hexagons with vertical lines indicate areas with consuming entities that make over $200,000 per year. Similarly, shapes with different colors, gradients, patterns, or the like can indicate different information. For example, shapes encompassing areas where consuming entities spend over $100 on an average (mean, median, or mode) Friday night can be shaded red, shapes encompassing areas where consuming entities spend less than $50 on an average Friday night can be shaded orange, and shapes encompassing areas where consuming entities spend less than $20 on an average Friday night can be shaded yellow. Similar shapes can be representative of holiday seasons, tourist seasons, weekdays, weekends, or other periods of time.

It should be appreciated that when determining averages and other information associated with consuming or provisioning entities, embodiments described herein have the ability to remove outlying interactions. For example, a car that was bought on a Friday night may not be included in an average amount of money spent by a particular consuming entity on Friday nights. Similarly, a consuming entity that is a business and makes over $200,000 per year may be calculated different from consuming entities that are not businesses, or not at all, when determining the income of consuming entities in a particular area.

In addition, in some embodiments interaction data and user interfaces can be updated at various intervals. In some embodiments interaction data and user interface 500 can be updated every night or week. In some embodiments, interaction data and maps can be updated in real- or near-real-time. For example, interaction data can be stored in a real-time distributed computation environment that supports stream-oriented processing. For example, the data can be stored in a data structure using Hadoop's Distributed File System, Vertica™, or Amazon™ S3. In some embodiments, the data structure storing the interaction data can be incrementally updated at particular intervals by a data computation system, such as Apache's Spark™, providing a user with real-time or near real-time information about interaction and/or updates to user interface 500. Regardless of when or how often interaction data and user interface 500 are updated, embodiments described herein greatly reduce the time required to compute sets of provisioning and/or consuming entities, user interfaces, and locations where marketing material or new provisioning entities should be placed (e.g., where a new franchise should be placed).

FIG. 6 is a diagram of an exemplary user interface 600 displaying a map 610. In this example embodiment, user interface 600 indicates where consuming entities spend money. User interface 600 includes a widget 620 that can allow a user to select various options, and a legend 630 that can display information. Various shapes are shown in user interface 600 that indicate locations and amounts where consuming entities spent money (e.g., where an aggregated amount of sales occurred).

As with user interface 500 of FIG. 5, user interface 600 includes one or more widgets 620 that cause user interface 600 to display particular information. In some embodiments, some or all information to be displayed on user interface 600 is predetermined, while in others some or all of the information to be displayed is adjustable by a user. For example, a user can use different types of widgets to zoom in on map 610, zoom out, show the number of interactions that occurred in a particular area (e.g., an aggregate amount of sales), the amount of money spent in a particular area (e.g., an aggregate amount of money made from sales), the number of provisioning entities in a particular area, the types of provisioning entities in a particular area, the types of credit cards used at stores in a particular area, the time of day, week, month, or year that interactions occur in a particular area, etc.

For example, as indicated by legend 630, dotted hexagons indicate areas where provisioning entities make less than $20,000 in revenue (or net sales, profits, etc.); criss-crossed hexagons indicate areas where provisioning entities make between $20,000 and $50,000 in revenue; hexagons with diagonal lines indicate areas where provisioning entities make between $50,000 and $100,000 in revenue; and hexagons with vertical lines indicate areas where provisioning entities make over $100,000 in revenue. In this example, the amounts could vary by day or week, and more or less hexagons could be included in various portions of user interface 600.

As mentioned with reference to user interface 500, different shapes can be used to signify different information. For instance, squares could be used to indicate the number of interactions in a particular region, while circles could be used to indicate the amount spent in the interactions in a particular region. Similarly, various shapes could signify that a particular area contains a particular amount of a particular type of provisioning entity. For instance, octagons can indicate that a particular amount of clothing stores are located in an area where the amount spent at the clothing stores is above a particular threshold. Or, for instance, rectangles can indicate city blocks where particular amount of grocery stores are located compared to the number of consuming entities within that area. Of course, these are merely examples and many combinations and permutations are possible. Different shapes of different colors and sizes could be used to represent various ratios associated with consuming and/or provisioning entities. In some embodiments, only particular types of provisioning entities may be shown, or used to determine a preferred location of a provisioning entity (e.g., a location where a provisioning entity should open a new store).

FIG. 7 is a diagram of an exemplary user interface 700 displaying a map 710. In this example embodiment, user interface 700 indicates the preferred location of a provisioning entity 740. Similar to user interfaces 500 and 600, user interface 700 also includes a widget 720 and a legend 730. Unlike example user interfaces 500 and 600, however, example user interface 700 includes a preferred location of a provisioning entity 740. A preferred location of a provisioning entity can include a variety of locations, including, but not limited to: a location where a new store should be opened; a location where a building/store should be renovated; a location where a warehouse should be placed; a location where a kiosk should be placed; a location where a particular type of good should be sold; a location where a store should be closed; a location where a food truck should be parked; a location where an automated teller machine should be placed; a location where a government agency building should be placed; a location where a particular type of provisioning entity should not be placed; etc.

For example, the preferred location of a provisioning entity 740 is indicated by a star in user interface 700. The location of the preferred provisioning entity 740 can be determined by a variety of factors, including factors associated with user interface 700 such as the intersection or overlap of various shapes. For instance, in user interface 700 the preferred location of provisioning entity 740 is at the intersection of three hexagons which indicate that provisioning entities within those areas on average make over $100,000 as indicated by legend 730. In some embodiments, interaction data can be used to determine the location of various high density housing locations and a preferred location of a provisioning entity 740 may be placed there. Additionally, historical data or data known about the future of a neighborhood (interaction data, population data, or other) can be analyzed to determine a preferred location of a provisioning entity 740.

In some embodiments, the same interaction data used to generate user interface 700 can be used to determine the preferred location of a provisioning entity 740. In some embodiments, supplemental information can be gathered to user interface 700 and/or the preferred location of a provisioning entity 740. For instance, while interaction data can be used to generate shapes in user interface 700, interaction data combined with data derived from mobile electronic devices can be used to generate the preferred location of a provisioning entity 740. In such an example, while interaction data derived from one or more sources can be used to determine an area of a particular size for a preferred location of provisioning entity 740, data acquired from mobile phones can indicate a particular street that consuming entities tend to travel on. As such, approaches described herein may indicate that a user should open a restaurant on that particular street within that particular shape on user interface 700.

FIG. 8 is a diagram of an exemplary user interface 800 displaying a map 810. In this example embodiment, user interface 800 indicates the preferred location of marketing material 840A, 840B, 840C, and 840D (collectively 840), consistent with the embodiments of the present disclosure. Similar to user interface 700, user interface 800 illustrates an example map 810 and shows the location of where consuming entities live as well as a preferred location of marketing material 840. Preferred marketing material can encompass a variety of material, including, but not limited to: billboards; signs; television advertisements; radio advertisements; mobile signs; etc.

In some embodiments supplemental data can be used to determine the preferred location of marketing materials 840. For instance, mobile device data can be gathered to determine where consuming entities often are. By combining information from interaction data indicating stores that have a high revenue, with supplemental data that indicates where consuming entities are likely to be, approaches herein can determine the preferred location of marketing material 840. For instance, by determining that consuming entities living in an area surrounded by a hexagon with vertical lines often visit a particular store or park based on supplemental data, the overlaid data on map 810 can indicate that a preferred location of marketing material 840 is in the particular store or park. As another example, supplemental data can include information about a city or traffic. For example, supplemental data can indicate that much of a city's traffic enters via a bridge 850. By using interaction data, mobile device data, and/or data about bridge 850, the overlaid data on map 810 can indicate a preferred location of marketing material (e.g., 840A).

Figure 9:
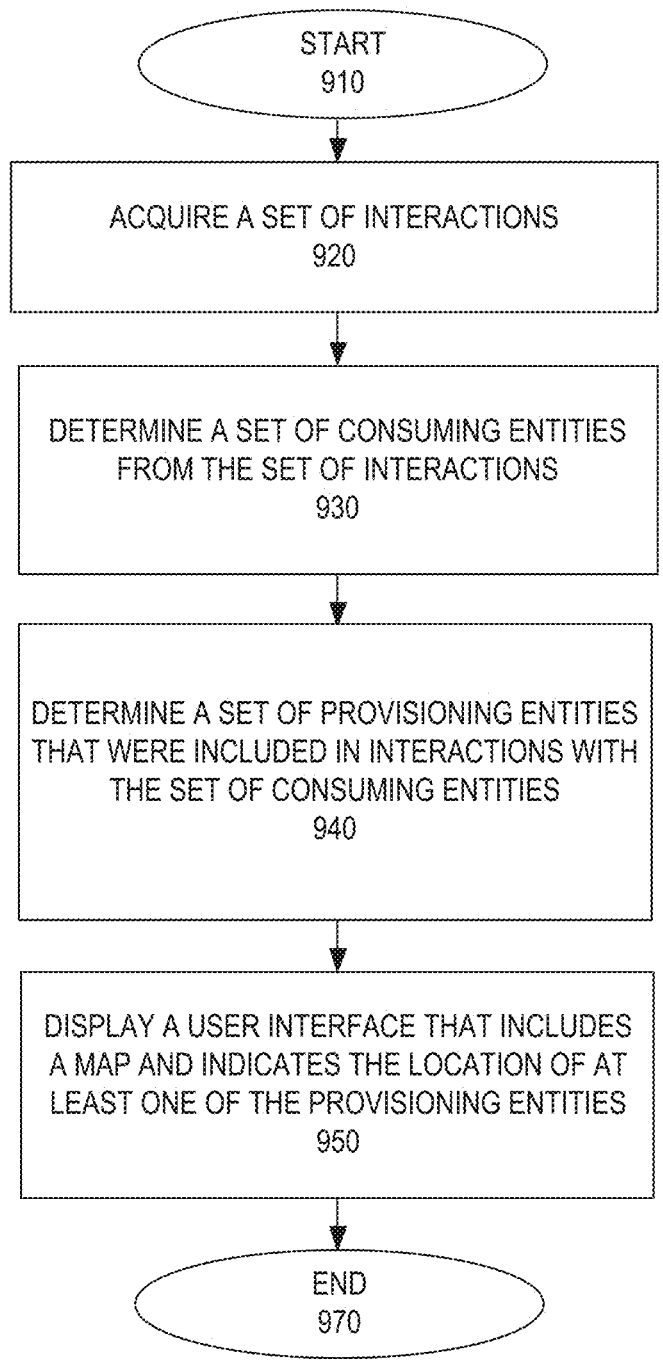
FIG. 9 is a flowchart representing an exemplary process for generating a user interface that includes a map, consistent with embodiments of the present disclosure.

FIG. 9 is a flowchart 900 representing an exemplary process for generating a user interface that includes a map, consistent with embodiments of the present disclosure. While the flowchart discloses the following steps in a particular order, it will be appreciated that at least some of the steps can be moved, modified, or deleted where appropriate, consistent with the teachings of the present disclosure. The analyzing of the entity performance can be performed in full or in part by a provisioning entity analysis system (e.g., provisioning entity analysis system 210). Flowchart 900 starts at step 910 and at step 920 acquires a set of interactions. In some embodiments, the acquired set of interactions can be based on a selection of a particular provisioning entity (e.g., provisioning entity PE001 of FIG. 4). For example, the interactions can include information associated with a purchase made at a store using a debit or credit card. Information associated with interactions, also referred to as interaction data or transaction data, can include information such as a consuming entity associated with an interaction, a provisioning entity associated with an interaction, an amount spent, a time of one or more interactions, information associated with previous interactions associated with either a provisioning entity or a consuming entity, the home location of a consuming entity, the work location of a consuming entity, at least one location of a provisioning entity, a Merchant Category Code ("MCC"), etc. In some embodiments, supplemental or canonical data can be gathered to gain further insight into spending habits and/or location information associated with consuming and provisioning entities.

At step 930, a set of consuming entities is determined from the set of interactions. Since, in various embodiments, each interaction is associated with at least one consuming entity and at least one provisioning entity, a set of interactions is typically associated with more than one consuming entity. As discussed above, consuming entities can include, but are not limited to: a person; a household; a business; or any other entity capable of purchasing a good or service. In this example, the set of consuming entities are entities that were included in interactions from the set of interactions (e.g., a consuming entity included in the set of consuming entities entered into an interaction with at least one provisioning entity associated with the set of interactions). In some embodiments, a subset of consuming entities can be determined from the interactions. For example the subset may include randomly selected consuming entities. In the scenario where the acquired set of interactions is based on a selection of a particular provisioning entity (e.g., provisioning entity PE001 of FIG. 4), the set of consuming entities are those consuming entities interacting with that particular provisioning entity.

At step 940 a set of provisioning entities that were included in interactions with the set of consuming entities are determined. Moreover, provisioning entities that entered into interactions with a determined consuming entity in the last 60 days can be determined. As a more general example, after a set of consuming entities is derived based on a set of interactions, the provisioning entities that the consuming entities entered into interactions with are included in the set of provisioning entities. Note that these provisioning entities need not be included in the set of interactions referenced in step 920, but instead these provisioning entities are typically entities that were included in interactions with the set of consuming entities. For example, in the scenario where the consuming entities have been identified based on their interactions with the particular provisioning entity, it can be determined which other provisioning entities that those consuming entities interacted with. For example, in the scenario from FIG. 4, User 1 (besides interacting with PE001) has also interacted with Merchant 2. Accordingly, Merchant 2 would be part of the determined set of provisioning entities.

Moreover, the determined set of provisioning entities can be based a particular period of time. For instance, the set of provisioning entities can include any provisioning entity included in an interaction with one of the consuming entities of the set of consuming entities in the previous 60 days. Similarly, the set of provisioning entities can be the provisioning entities included in interactions with the set of consuming entities over the last twenty weekends. As discussed above, some interactions between provisioning and consuming entities can be filtered based on other parameters. For instance, an interaction may not be included when determining a set of provisioning entities if it occurred further than a particular distance from a particular point (e.g., 100 kilometers away from an area displayed on a map). Similarly, interactions that occur at airports or on cruise ships may similarly be removed from the set of interactions used to determine the set of consuming entities or the set of provisioning entities.

At step 950 a user interface is displayed that includes a map and indicates information pertaining to the location of at least one of the determined provisioning entities. For example, from the determined set of provisioning entities, a user interface can display the entire set, or only a portion thereof. In various embodiments, a user interface can display the set of provisioning entities as one or more geometric shapes. Such shapes can indicate various attributes associated with the provisioning entities located within those shapes. For example, the shapes can be shaded or colored to indicate the amount of money a provisioning entity makes; the amount of interactions that occur at the average provisioning entity within the shape; etc. In some embodiments, based on this information, systems and methods described herein can determine the preferred location of a provisioning entity or marketing material (e.g., a location where a new store should be opened or a location where an advertisement should be placed).

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system comprising:
   a memory device configured to store a set of instructions; and
   one or more processors configured to execute the set of instructions that cause the one or more processors to:
      receive an indication of a provisioning entity;
      access a set of interaction data associated with the provisioning entity, wherein each interaction data item included in the set of interaction data includes indications of at least: a time, a location, at least one provisioning entity, and at least one consuming entity;
      generate user interface data configured to be rendered as a graphical user interface, wherein the graphical user interface includes:
         an interactive map, and
         at least one user selectable graphical element configured to receive analysis criteria from a user;
      analyze the set of interaction data to determine a subset of interaction data that satisfies the analysis criteria;
      analyze the subset of interaction data to determine:
         a set of consuming entities derived from interaction data items of the subset of interaction data, and
         a set of provisioning entities derived from interaction data items of the subset of interaction data;
      determine a type of geometric shape to overlay on each of one or more areas of the map, wherein each of the one or more areas is associated with a same type of geometric shape,
      for each of the one or more areas, and based the subset of interaction data:
         determine a respective aggregate revenue amount from interaction data items of the subset of interaction data that are associated with locations within the area;
      update the graphical user interface to further include:
         a first graphical overlay including one or more geometric shapes of the type of geometric shape, wherein:
            each of the one or more geometric shapes corresponds to a respective one of the one or more areas,
            each of the one or more geometric shapes is superimposed on the respective one or more areas, and
            each of the one or more geometric shapes is visually modified to indicate categories of respective aggregate revenue amounts associated with the area over which the geometric shape is superimposed;
         determine a preferred general location of a new provisioning entity based on an overlap or intersection of two or more geometric shapes associated with a same category of aggregate revenue amounts;
         access a set of mobile device data derived from one or more mobile electronic devices and indicative of locations frequented by consuming entities of the set of consuming entities;
         determine, based on the set of mobile device data and the preferred general location, a preferred specific location of the new provisioning entity by identifying a location frequented by consuming entities located within the preferred general location; and
         update the graphical user interface to further include:
            a second graphical overlay including a visual indicator of the preferred specific location of the new provisioning entity, wherein the second graphical overlay overlaps the first graphical overlay.

2. The system of claim 1, wherein:
   the one or more geometric shapes have a same size,
   the one or more geometric shapes are visually modified by shading inside portions of the geometric shapes, and
   the categories comprise non-overlapping ranges of revenue amounts.

3. The system of claim 2, wherein the type of geometric shape is determined based at least in part on a type of information displayed on the map.

4. The system of claim 3, wherein analyzing the set of interaction data further comprises:
   analyzing the set of interaction data, based on the time period, to determine the subset of interaction data that are associated with respective times falling within the time period.

5. The system of claim 4, wherein the set of instructions further cause the one or more processors to:
   receive, via the graphical user interface, analysis criteria including at least:
      an indication of a geographical location,
      an indication of a distance from the geographical location, and
      an indication of a time period,
   wherein analyzing the subset of interaction data comprises:
      analyzing the subset of interaction data, based on the indication of the geographical location and the indication of the distance from the geographical location, to determine the set of provisioning entities that are within the distance from the geographical location.

6. The system of claim 5, wherein the one or more areas do not overlap with one another, but the one or more geometric shapes may overlap with one another.

7. The system of claim 6, wherein:
   each of the one or more areas is associated with geographical locations of the one or more provisioning entities from said set of provision entities, and
   the same type of geometric shape is indicative of a same attribute associated with the one or more provisioning entities.

8. The system of claim 7, wherein determining the respective aggregate revenue amount from interaction data items of the subset of interaction data comprises determining the respective aggregate revenue amount from interaction data items of the subset of interaction data that are associated with provisioning entities with locations within the area.

* * * * *